United States Patent
Yu et al.

(10) Patent No.: US 9,108,158 B2
(45) Date of Patent: Aug. 18, 2015

(54) ULTRATHIN, MOLECULAR-SIEVING GRAPHENE OXIDE MEMBRANES FOR SEPARATIONS ALONG WITH THEIR METHODS OF FORMATION AND USE

(71) Applicants: Miao Yu, Pittsford, NY (US); Hang Li, Columbia, SC (US)

(72) Inventors: Miao Yu, Pittsford, NY (US); Hang Li, Columbia, SC (US)

(73) Assignee: University of South Carolina, Columbia, SC (US)

( * ) Notice: Subject to any disclaimer, the term of this patent is extended or adjusted under 35 U.S.C. 154(b) by 6 days.

(21) Appl. No.: 14/180,724

(22) Filed: Feb. 14, 2014

(65) Prior Publication Data
US 2014/0230653 A1 Aug. 21, 2014

Related U.S. Application Data

(60) Provisional application No. 61/850,415, filed on Feb. 14, 2013.

(51) Int. Cl.
*B01D 71/02* (2006.01)
*B01D 67/00* (2006.01)
*B01D 53/22* (2006.01)

(52) U.S. Cl.
CPC .......... *B01D 67/0046* (2013.01); *B01D 71/021* (2013.01); *B01D 2325/04* (2013.01)

(58) Field of Classification Search
CPC ............. B01D 67/0002; B01D 67/009; B01D 67/0046; B01D 71/021; B01D 71/06; B01D 2325/04
USPC ............................................................ 96/11
See application file for complete search history.

(56) References Cited

U.S. PATENT DOCUMENTS

2009/0235721 A1* 9/2009 Robinson et al. ............. 73/31.05
2011/0037033 A1* 2/2011 Green et al. .................. 252/510
(Continued)

FOREIGN PATENT DOCUMENTS

WO WO 2013/127712 A1 * 9/2013 ................. C08J 3/02
WO WO 2014/168629 A1 * 10/2014 ............ B01D 69/14

OTHER PUBLICATIONS

Lai et al., "Microstructural Optimization of a Zeolite Membrane for Organic Vapor Separation", Science vol. 300, Apr. 18, 2003, p. 456-460.
(Continued)

*Primary Examiner* — Jason M Greene
(74) *Attorney, Agent, or Firm* — Dority & Manning, P.A.

(57) ABSTRACT

Methods for forming an ultrathin GO membrane are provided. The method can include: dispersing a single-layered graphene oxide powder in deionized water to form a single-layered graphene oxide dispersion; centrifuging the graphene oxide dispersion to remove aggregated graphene oxide material from the single-layered graphene oxide dispersion; thereafter, diluting the single-layered graphene oxide dispersion by about ten times or more through addition of deionized water to the graphene oxide dispersion; and thereafter, passing the single-layered graphene oxide dispersion through a substrate such that a graphene oxide membrane is formed on the substrate. Filtration membranes are also provided and can include: a graphene oxide membrane having a thickness of about 1.8 nm to about 180 nm, with the graphene oxide membrane comprises about 3 to about 30 layers of graphene oxide flakes.

22 Claims, 21 Drawing Sheets

(56) References Cited

U.S. PATENT DOCUMENTS

| | | |
|---|---|---|
| 2011/0210282 A1* | 9/2011 | Foley .................... 252/62.51 R |
| 2011/0256376 A1* | 10/2011 | Compton et al. ............. 428/220 |
| 2012/0021224 A1* | 1/2012 | Everett et al. ................. 428/408 |
| 2012/0208088 A1* | 8/2012 | Xie et al. ................... 429/231.8 |
| 2013/0213902 A1* | 8/2013 | Browne et al. ................ 210/767 |
| 2013/0270188 A1* | 10/2013 | Karnik et al. .................... 96/11 |
| 2013/0305927 A1* | 11/2013 | Choi et al. ......................... 96/13 |
| 2013/0314844 A1* | 11/2013 | Chen et al. .................... 361/502 |
| 2013/0330833 A1* | 12/2013 | Ruiz et al. ...................... 436/174 |
| 2014/0120453 A1* | 5/2014 | Ajayan et al. ................. 429/482 |
| 2014/0318373 A1* | 10/2014 | Wood et al. ........................ 96/11 |

OTHER PUBLICATIONS

Choi et al., "Grain Boundary Defect Elimination in a Zeolite Membrane by Rapid Thermal Processing", Science vol. 325, Jul. 31, 2009, p. 590-593.

Varoon et al., "Dispersible Exfoliated Zeolite Nanosheets and Their Application as a Selective Membrane", Science vol. 334, Oct. 7, 2011, p. 72-75.

Yu et al., "Zeolite Membranes: Microstructure Characterization and Permeation Mechanisms", Accounts of Chemical Research vol. 44, No. 11, Nov. 2011, p. 1196-1206.

de Vos et al., "High-Selectivity, High-Flux Silica Membranes for Gas Separation", Science vol. 279, Mar. 13, 1998, p. 1710-1711.

Shiflett et al., "Ultrasonic Deposition of High-Selectivity Nanoporous Carbon Membranes", Science vol. 285, Sep. 17, 1999, p. 1902-1905.

Park et al., "Polymers with Cavities Tuned for Fast Selective Transport of Small Molecules and Ions", Science vol. 318, Oct. 12, 2007, p. 254-258.

Dikin et al., "Preparation and characterization of grapheme oxide paper", Nature vol. 448, Jul. 26, 2007, p. 457-460.

Chen et al., "Oxidation resistance of Graphene-Coated Cu and Cu/Ni Alloy", ACS Nano vol. 5, No. 2, 2011, p. 1321-1327.

Lee et al., "Measurement of the Elastic Properties and Intrinsic Strength of Monolayer Graphene", Science vol. 321 Jul. 18, 2008, p. 385-388.

Bunch et al., "Impermeable Atomic Membranes from Graphene Sheets", Nano Letters vol. 8. No. 8, Aug. 2008, p. 2458-2462.

Nair et al., "Unimpeded Permeation of Water Through Helium-Leak-Tight Graphene-Based Membranes", Science vol. 335, Jan. 27, 2012, p. 442-444.

Leenaerts et al., "Graphene: A perfect nanoballoon", Applied Physics Letters 93, 2008, 193107-1-193107-3.

Jiang et al., "Porous Graphene as the Ultimate Membrane for Gas Separation", Nano Letters vol. 9, No. 12, Dec. 2009, p. 4019-4024.

Du et al., "Separation of Hydrogen and Nitrogen Gases with Porous Graphene Membrane", J. Phys. Chem. C 115, Dec. 2011, p. 23261-23266.

Schrier, Joshua, "Helium Separation Using Porous Graphene Membranes", J. Phys. Chem. Lett. 1, Aug. 2010, p. 2284-2287.

Hauser et al., "Nanoporous Graphene Membranes for Efficient [3]He/[4]He Separation", J. Phys. Chem. Lett. 3, 2012 p, 209-213.

Suk et al., "Water Transport through Ultrathin Graphene", J. Phys. Chem. Lett. 1, May 2010, p. 1590-1594.

Schrier et al., "Thermally-driven isotope separation across nanoporous graphene", Chemical Physics Letters 521, Jan. 2012, p. 118-124.

Le et al., "Two-dimensional polyphenylene: experimentally available porous graphene as a hydrogen purification membrane", Chem. Commun. 46, 2010, p. 3672-3674.

Koenig et al., "Selective molecular sieving through porous graphene", Nature Nanotechnology vol. 7, Nov. 2012, p. 728-732.

Oyama et al., "Theory of hydrogen permeability in nonporous silica membranes", Journal of Membrane Science 244, 2004, p. 45-53.

Qin et al., "Graphene with line defect as a membrane for gas separation: Design via a first-principles modeling", Surface Science 607, Jan. 2013, p. 153-158.

Ockwig et al., "Membranes for Hydrogen Separation", Chem. Rev. 107, 2007, p. 4078-4110.

Bernardo et al., "Membrane Gas Separation: A Review/State of the Art", Ind. Eng. Chem. Res. 48, 2009, p. 4638-4663.

Brunetti et al., "Membrane technologies for $CO_2$ separation", Journal of Membrane Science 359, 2010, p. 115-125.

Scholes et al., "$CO_2$ capture from pre-combustion processes-Strategies for membrane gas separation", International Journal of Greenhouse Gas Control 4, Sep. 2010, 739-755.

Hong et al., "Hydrogen purification using a SAPO-34 membrane", Journal of Membrane Science 307, Jan. 2008, p. 277-283.

Guan et al., "Characterization of $AlPO_4$-type molecular sieving membranes formed on a porous $\alpha$-alumina tube", Journal of Membrane Science 214, 2003, 191-198.

Tomita et al., "Gas separation characteristics of DDR type zeolite membrane", Microporous and Mesoporous Materials 68, Mar. 2004, p. 71-75.

Robeson, Lloyd M., "The upper bound revisited", Journal of Membrane Science 320, Jul. 2008, p. 390-400.

Li et al., "Zeolitic imidazolate framework ZIF-7 based molecular sieve membrane for hydrogen separation", Journal of Membrane Science 354, May 2010, p. 48-54.

Jeong et al., "Evidence of Graphitic AB Stacking Order of Graphite Oxides", J. Am. Chem. Soc. 130, Jan. 2008, p. 1362-1366.

Kolmakov et al., "Graphene oxide windows for in situ environmental cell photoelectron spectroscopy", Natue Nanotechnology 6, Oct. 2011, p. 651-657.

Schniepp et al., "Functionalized Single Graphene Sheets Derived from Splitting Graphite Oxide", J. Phys. Chem. B. vol. 110, No. 17, May 2006, p. 8535-8539.

Ferrari et al., "Interpretation of Raman spectra of disordered and amorphous carbon", Physical Review B. vol. 61, No. 20, May 2000. p. 14 095-14 107.

Graf et al., "Spatially resolved Raman Spectroscopy of Single- and Few-Layer Graphene", Nano Letters, vol. 7, No. 2, Feb. 2007, p. 238-242.

Cançado et al., "Quantifying Defects in Graphene via Raman Spectroscopy at Different Excitation Energies", Nano Letters 11, Aug. 2011, p. 3190-3196.

Strano et al., "Temperature-and pressure-dependent transient analysis of single component permeation through nanoporous carbon membranes", Carbon 40, 2002, p. 1029-1041.

* cited by examiner

| No. | Symbol | Membrane material | Temperature range, °C |
|---|---|---|---|
| 1 | ● | Silica | |
| 2 | ● | Silica | |
| 3 | ● | Silicon carbide | |
| 4 | ● | MFI Zeolite (modified) | 100-300 |
| 5 | ● | ZIF-7 | |
| 6 | ● | Molecular sieve | |
| 7 | ■ | DDR zeolite | |
| 8 | ■ | Silica-titania | >300 |
| 9 | ■ | MFI zeolite (modified) | |
| 10 | ◆ | Zeolite composite | <100 |
| 11 | ◆ | MOF | |
| 12 | ■ | GO (1.8-nm, this work) | |
| | ● | GO (9-nm, this work) | 20-100 |
| | ▲ | GO (18-nm, this work) | |

ULTRATHIN, MOLECULAR-SIEVING GRAPHENE OXIDE MEMBRANES FOR SEPARATIONS ALONG WITH THEIR METHODS OF FORMATION AND USE

PRIORITY INFORMATION

The present application claims priority to U.S. Provisional Patent Application Ser. No. 61/850,415 titled "Ultrathin, Molecular-Sieving Graphene Oxide Membranes for Separations" of Yu, et al. filed on Feb. 14, 2013, the disclosure of which is incorporated by reference herein.

BACKGROUND

Microporous membranes, including zeolite membranes, silica membranes, carbon membranes, and microporous polymeric membranes, have shown excellent gas mixture separation performance and may have wide applications in many industrially important separation processes. Current microporous membranes, however, are usually thick (thickness greater than 20 nm) in order to minimize flux contribution through non-selective defects and maintain reasonable separation selectivity. Further reducing membrane thickness to sub-20 nm range to lower transport resistance without introducing extra non-selective defects is highly challenging for current microporous membranes. This challenge may result from the limitations of membrane materials and/or membrane preparation techniques.

Graphene-based materials, such as graphene and graphene oxide (GO), have been considered as a promising membrane material, because they are only one carbon atom thick, and thus may form the thinnest separation membranes to maximize flux. Besides, they have good stability and strong mechanical strength. However, these graphene-based materials have been found to be impermeable to small gas molecules. Extensive simulation studies, therefore, have been conducted to understand effects of various potential defects or artificially generated "holes" on permeation behaviors of molecules and to predict mixture separation performance. Very recently, others reported an etched graphene by UV-induced oxidation to create pores, and found that the transport rates of $H_2$ and $CO_2$ were 3 to 4 orders of magnitude higher than $N_2$ and $CH_4$ through porous graphene flakes.

However, no practical graphene-based separation membranes have been prepared for studying their separation potential for gas mixtures.

SUMMARY

Objects and advantages of the invention will be set forth in part in the following description, or may be obvious from the description, or may be learned through practice of the invention.

Methods are generally provided for forming an ultrathin GO membrane. In one embodiment, the method comprises: dispersing a single-layered graphene oxide powder in deionized water to form a single-layered graphene oxide dispersion; centrifuging the graphene oxide dispersion to remove aggregated graphene oxide material from the single-layered graphene oxide dispersion; thereafter, diluting the single-layered graphene oxide dispersion by about ten times or more through addition of deionized water to the graphene oxide dispersion; and thereafter, passing the single-layered graphene oxide dispersion through a substrate such that a graphene oxide membrane is formed on the substrate.

Filtration membranes, such as those formed according to the presently provided methods, are also provided. In one embodiment, the filtration membrane includes: a graphene oxide membrane having a thickness of about 1.8 nm to about 180 nm, with the graphene oxide membrane comprises about 3 to about 30 layers of graphene oxide flakes.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1B showing an AFM image of a GO flake on freshly cleaved mica; FIG. 1C showing the height profile across the line in FIG. 1B; FIG. 1D showing a FE-SEM image of the surface of a GO membrane (about 18-nm thick) on porous AAO; FIG. 1E showing a FE-SEM image of the GO membrane surface (about 18-nm thick) with higher magnification; FIG. 1F showing an AAO surface without GO membrane; FIG. 1G showing a FE-SEM image of the cross-sectional view of a thick GO membrane (about 180 nm) where the ultrathin GO membranes (1.8, 9, and 18 nm thick) were prepared by diluting GO filtration solution for the 180-nm thick membrane in (G) by 100, 20, and 10 times, while maintaining total filtration solution volume constant at 25 ml; FIG. 1H shows an Al 2P and FIG. 1I shows a C 1S XPS spectra of ultrathin GO membranes (ca. 1.8, 9, and 18 nm thick) supported on porous AAO. The scale bars in FIG. 1B being 500 nm, in FIG. 1D being 5 μm, in FIGS. 1E and 1F being 100 nm; in FIG. 1G being 1 μm.

FIGS. 3C and 3D showing separation results for 9-nm thick GO membrane; FIGS. 3E and 3F showing separation results for 18-nm thick GO membrane; and FIG. 3G shows a comparison of ultrathin GO membranes with polymeric membranes and inorganic microporous membranes for $H_2/CO_2$ mixture separation: selectivity versus $H_2$ permeance. The lowest line is the 2008 upper bound of polymeric membrane for $H_2/CO_2$, assuming membrane thickness is 1 μm. The points (1-11) are microporous inorganic membranes from literature, and the upper line is the proposed upper bound for inorganic membranes, based on these points (1-11). The points (12) circled with a dotted line are ultrathin GO membranes from this study. The table of FIG. 1H explains points (1-12). Comparison with polymeric membranes for $H_2/N_2$ mixture separation is presented in FIG. 10.

FIG. 4B shows the dependence of GO concentration on the centrifuge time at 10000 rpm.

$$\text{Permeance} \propto e^{\frac{-(E_d - \Delta H_{ads})}{RT}}$$

where, $E_d$ is diffusion activation energy (kJ/mol) and $\Delta H_{ads}$ is the heat of adsorption (kJ/mol). From the above figure, the calculated $E_d - \Delta H_{ads}$ are 6.9 kJ/mol for $H_2$ and 60.2 kJ/mol for $CO_2$, respectively. Considering much weaker adsorption of $H_2$ on most of porous materials than $CO_2$, heat of adsorption of $CO_2$ on GO is also expected to be higher than $H_2$. Therefore, diffusion activation energy of $CO_2$ through the GO membrane is at least 53.3 kJ/mol higher than that of $H_2$, indicating much more activated diffusion of $CO_2$ through GO membranes or much tighter fit of $CO_2$ in defects of GO flakes.

Figure 10:
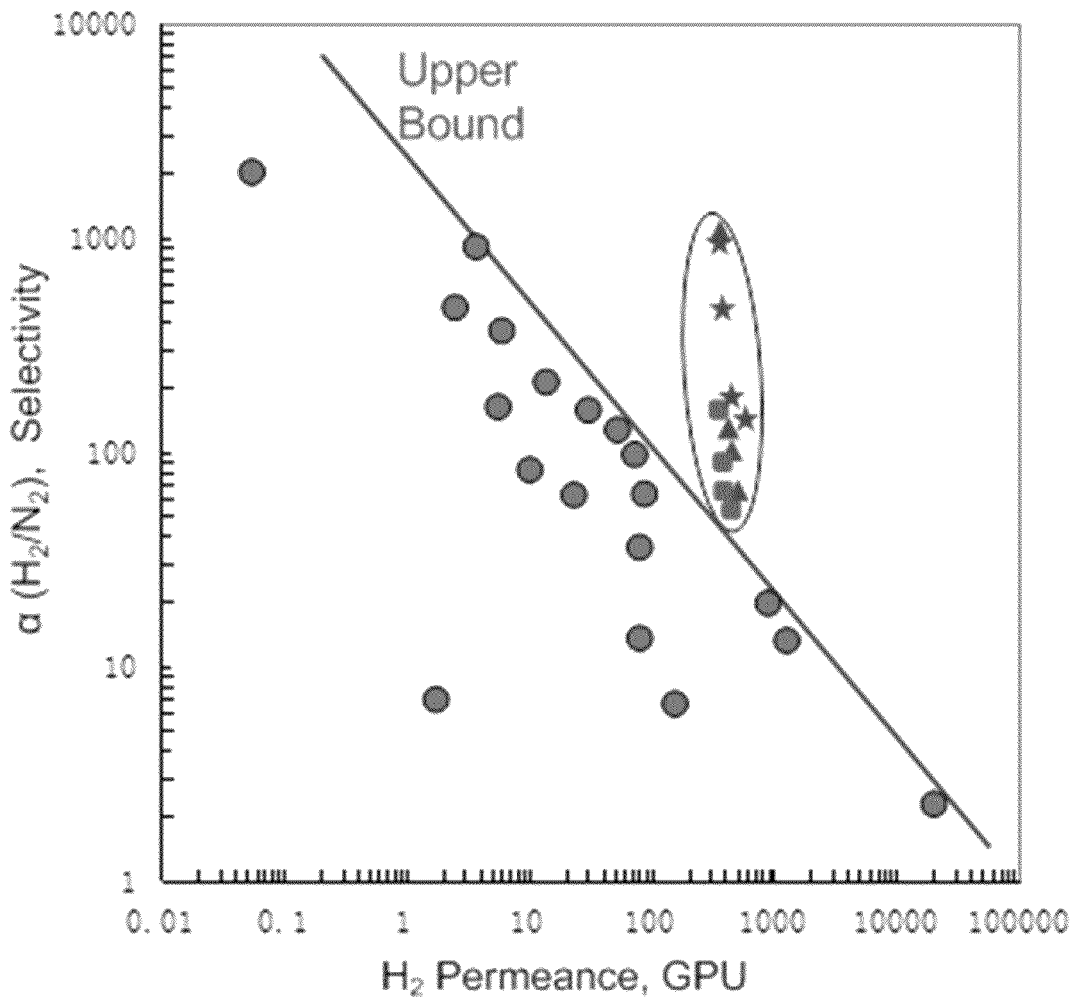

FIG. 10 shows a comparison of ultrathin GO membranes with polymeric membranes for $H_2/N_2$ mixture separation: selectivity versus $H_2$ permeance. The line is the 2008 upper bound of polymeric membranes for $H_2/N_2$ and round points are representative polymeric membranes, assuming membrane thickness is 1 μm. The circle points are representative points for polymeric membranes from literature. 1 GPU (Gas Permeance Unit) equals to $3.348 \times 10^{-8}$ mol/($m^2 \cdot s \cdot Pa$).

Figure 11:
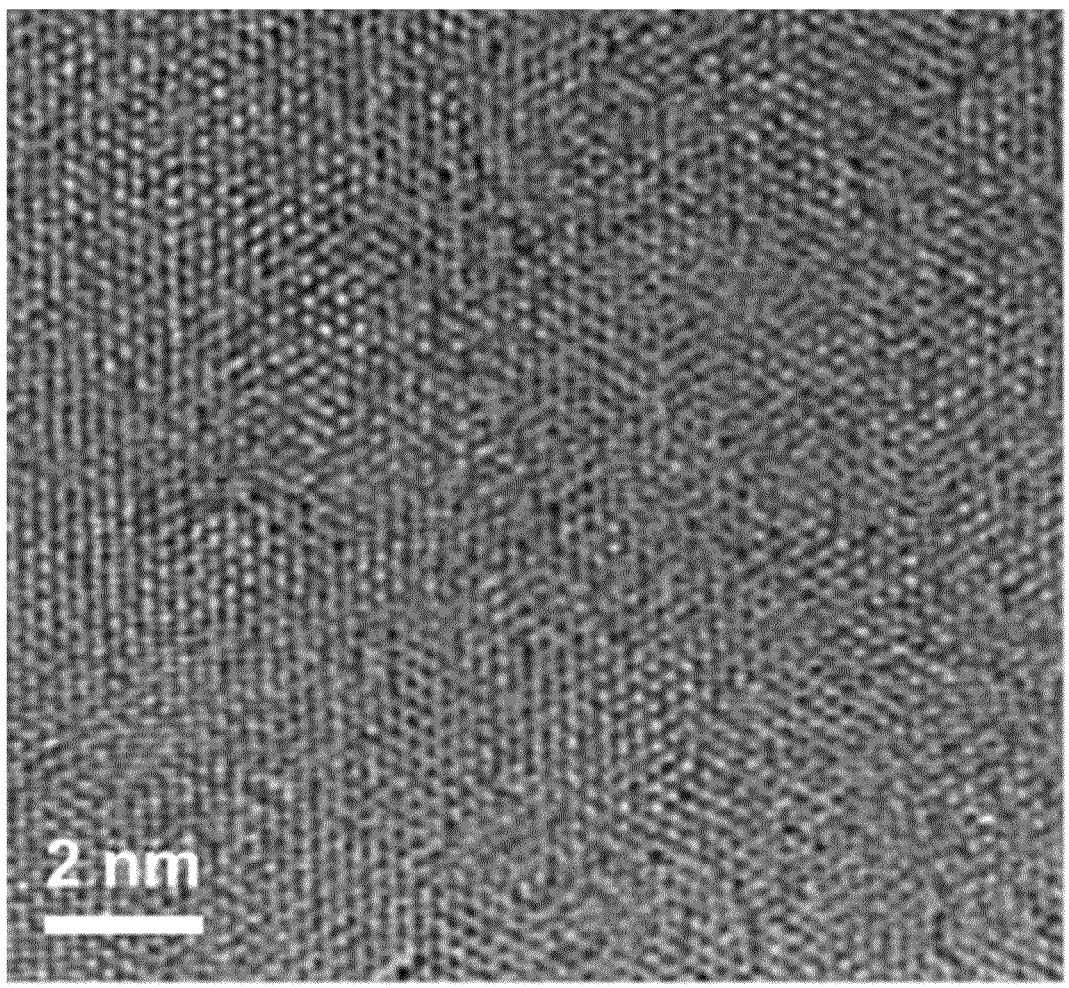

FIG. 11 shows a HRTEM image of a single-layer GO flake.

Figure 12:
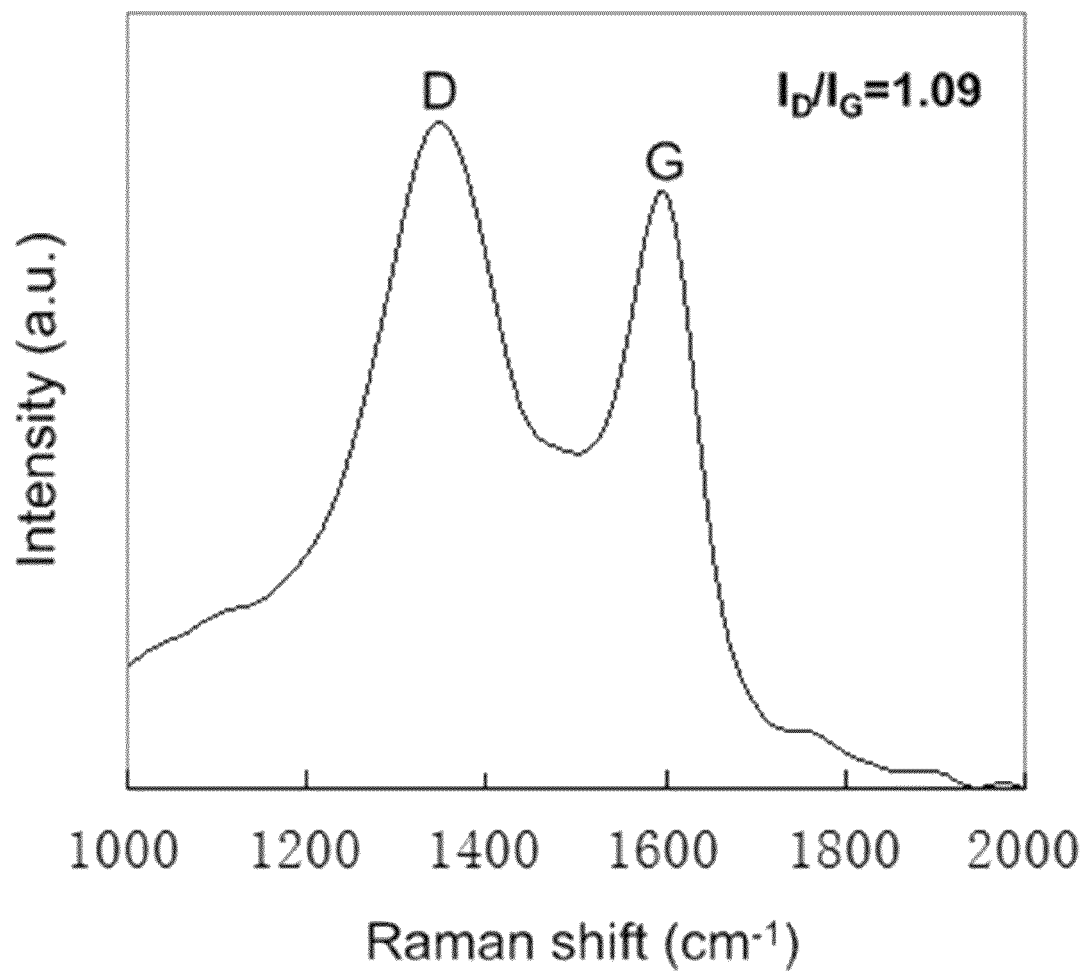

FIG. 12 shows a Raman spectrum of the GO powder. The ID/IG ratio is 1.09 as shown in the figure.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

Methods are generally provided for the preparation of large permeation area (e.g., about 4 $cm^2$ or greater) graphene oxide (GO) membranes, along with the resulting microporous inorganic membranes and methods of their use for separation of $H_2$ mixtures. In one embodiment, the GO membranes are composed of about 3 to about 30 layers of GO flakes, by a facile and scalable filtration process. Compared with current microporous inorganic membranes and polymeric membranes, this new class of ultrathin GO membranes showed superior separation performance for $H_2$ mixtures. Ultrathin, molecular-sieving membranes have great potential to realize high flux, high selectivity gas mixture separation at low energy cost.

The method of forming such an ultrathin GO membrane can begin with a single-layered graphene oxide powder. For example, the single-layered graphene oxide powder can be dispersed into deionized water to form a single-layered graphene oxide dispersion.

The single-layered graphene oxide dispersion can then be centrifuged to remove any aggregated graphene oxide material and other large particles from the single-layered graphene oxide dispersion. For example, the single-layered graphene oxide dispersion can be centrifuged for about 30 minutes to about 40 minutes. Depending on the size of the sample, the single-layered graphene oxide dispersion can be centrifuged at speeds of about 5,000 rotations per minute (rpm) to about 15,000 rpm, such as at about 10,000 rpm.

In one particular embodiment, the single-layered graphene oxide dispersion can be sonicated to ensure substantially uniform dispersion of the single-layered graphene oxide in the deionized water. For example, the single-layered graphene oxide dispersion can be sonciated for about 15 hours or more to ensure complete dispersion of the single-layered graphene oxide flakes within the dispersion. In one particular embodiment, sonication can be performed at ultrasonic frequencies (e.g., greater than about 20 kHz). Sonication is, in one embodiment, performed after centrifuging the single-layered graphene oxide dispersion such that substantially all of the large aggregations and/or particles have already been removed. In another embodiment, the single-layered graphene oxide dispersion can be sonicated prior to centrifuging.

In one embodiment, the single-layered graphene oxide dispersion is diluted by about ten times or more through the addition of deionized water after centrifuging and, optionally, sonicating. For example, the single-layered graphene oxide dispersion can be diluted by about twenty times or more through the addition of deionized water, such as about one hundred times or more. For instance, the single-layered graphene oxide dispersion can be diluted to a concentration of about 0.2 mg/mL to about 0.4 mg/mL, such as about 0.3 mg/mL.

The diluted single-layered graphene oxide dispersion can then be passed through a substrate such that a graphene oxide membrane is formed thereon. The substrate generally defines a plurality of relatively small pores. The graphene oxide membrane can be any suitable material, such as an aluminum oxide (e.g., an anodic aluminum oxide), a cellulose acetate, etc.

In one embodiment, the substrate is supported by a filter having pores larger than the pores present in the substrate.

The pores in the filter can, for instance, have a pore size of about 20 nm to about 100 nm.

The graphene oxide membrane can be dried to remove any residual water present in the membrane. For example, the graphene oxide membrane can be dried by storing the graphene oxide membrane in a vacuum desiccator.

The resulting graphene oxide membrane is, in one embodiment, generally formed from a plurality of single-layered graphene oxide flakes. These single-layered graphene oxide flakes can generally form layers stacked on each other. For example, the graphene oxide membrane can be formed from about 3 to about 10 layers of single-layered graphene oxide graphene oxide flakes. In certain embodiments, the single-layered graphene oxide flakes have a size up to about 500 nm.

The graphene oxide membrane has, in particular embodiments, a thickness of about 1.8 nm to about 180 nm, such as about 1.8 nm to about 20 nm (e.g., about 1.8 nm to about 18 nm).

EXAMPLES

Ultrathin, down to around 1.8 nm in thickness, graphene oxide (GO) membranes were prepared and were found to separate small gas molecules by molecular sieving through intrinsic structural defects on GO. These membranes were prepared by a facile and scalable filtration process and showed mixture separation selectivities of 3400 and 900 for $H_2/CO_2$ and $H_2/N_2$ mixtures, respectively, and $H_2$ permeances as high as $2\times10-7$ mol/($m^2 \cdot s \cdot Pa$). This new class of ultrathin, molecular-sieving membranes may have significant applications for $H_2$ separations, gas sensors, and seawater desalination.

Figure 1A:
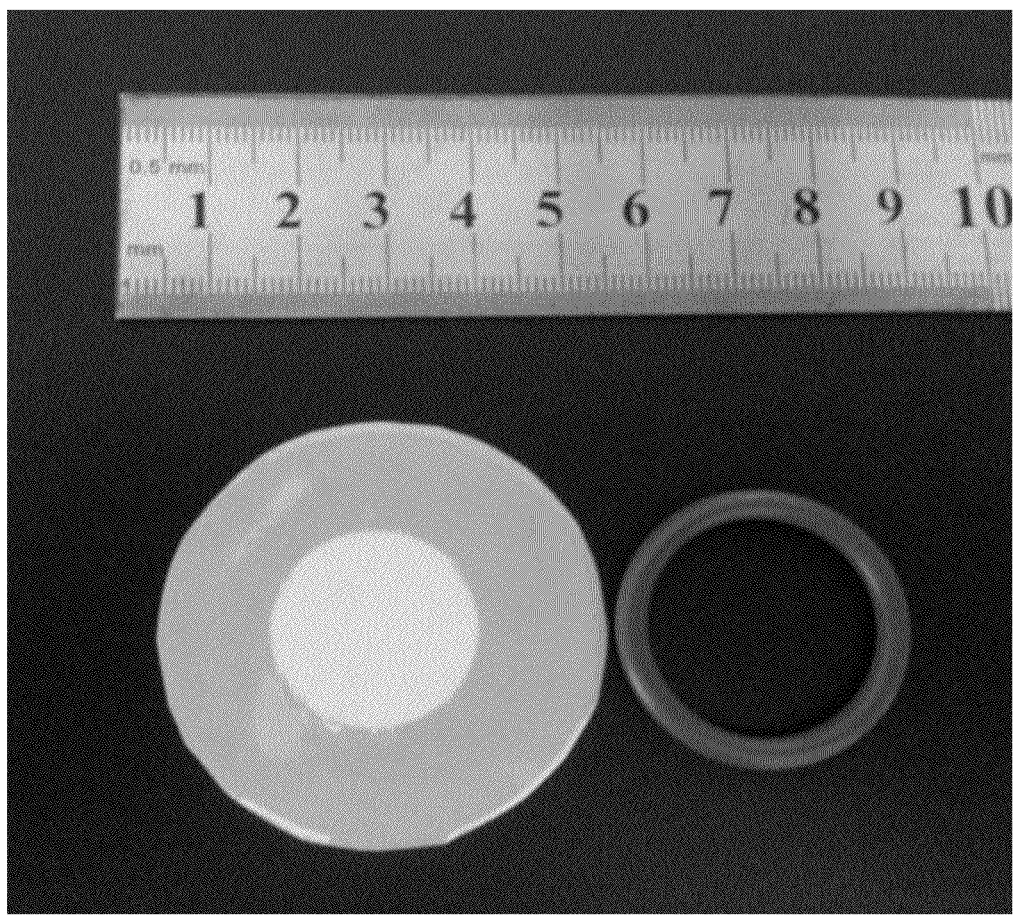
FIGS. 1A-1I show GO membranes supported on porous AAO, with FIG. 1A showing a digital picture of an ultrathin GO membrane on AAO (about 9 nm) with the middle open white area being the permeation area (~4 cm$^2$) with supported GO, and yellow tape is for GO protection and for sealing by O-ring during permeation measurements.
Figure 1B:
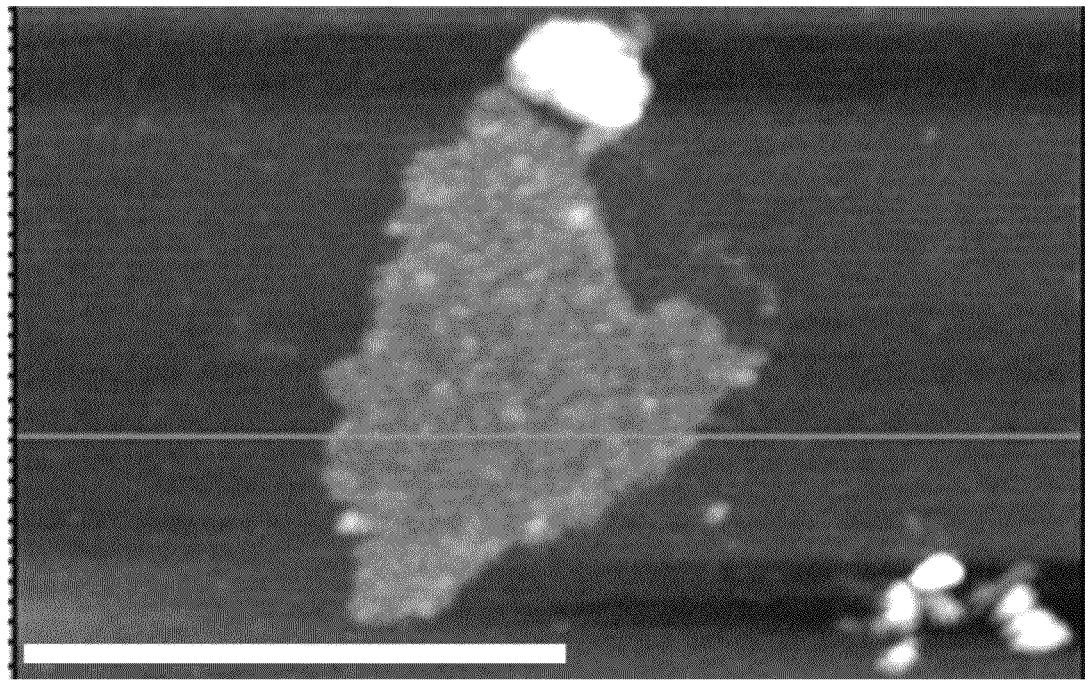
Figure 1C:
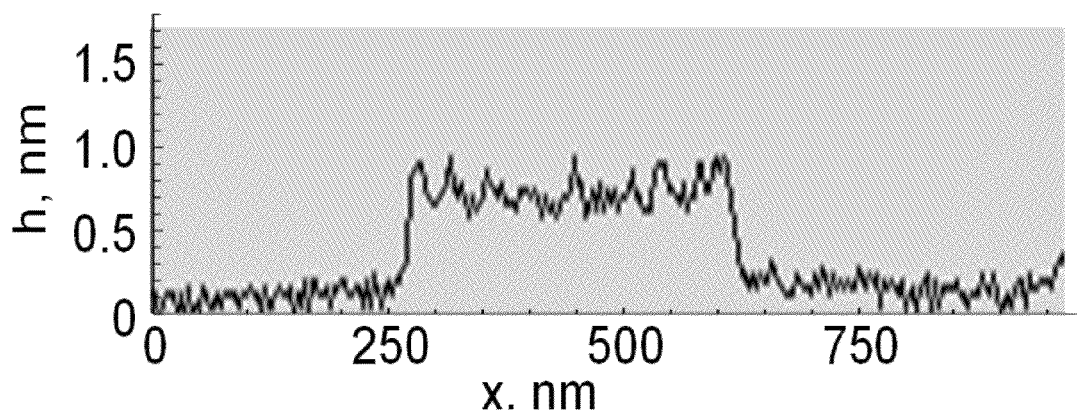
Figure 1D:
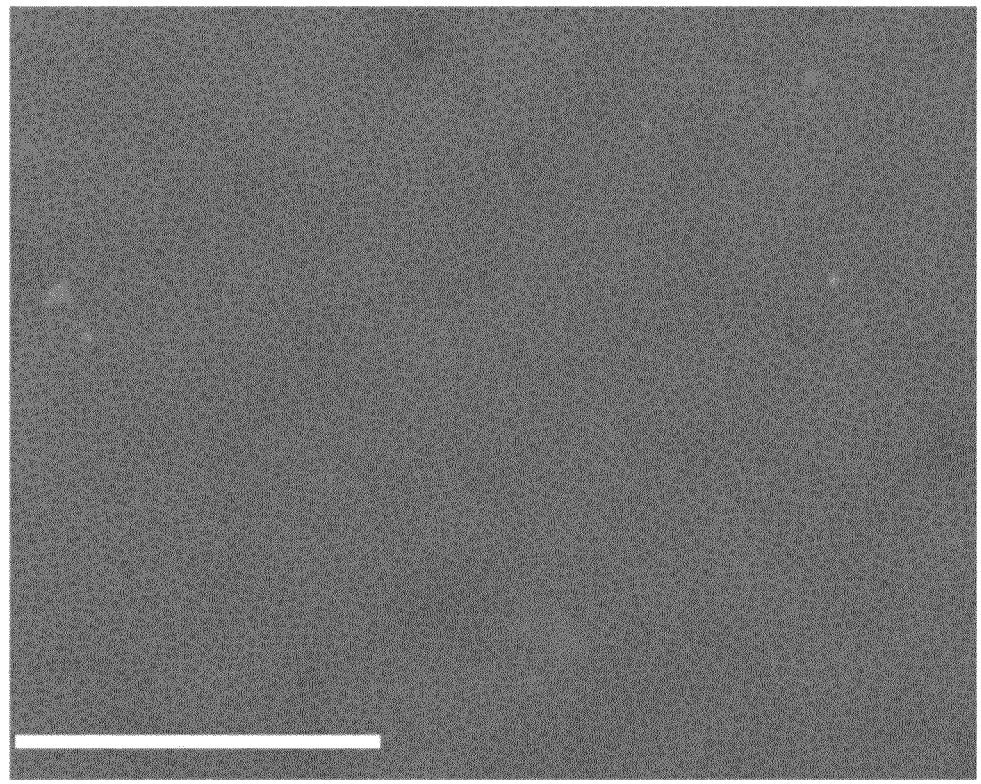
Figure 1E:
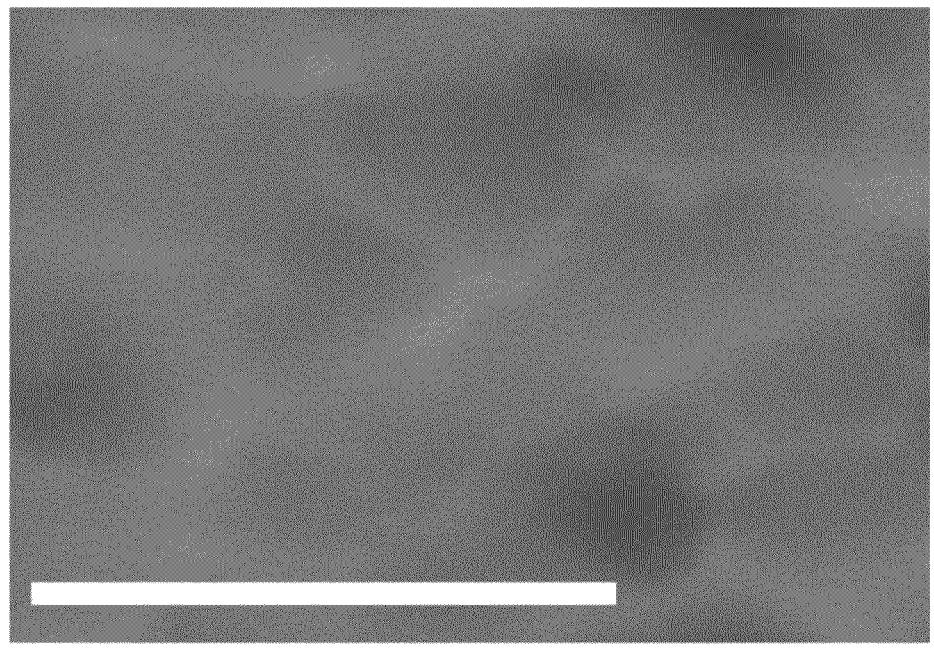
Figure 1F:
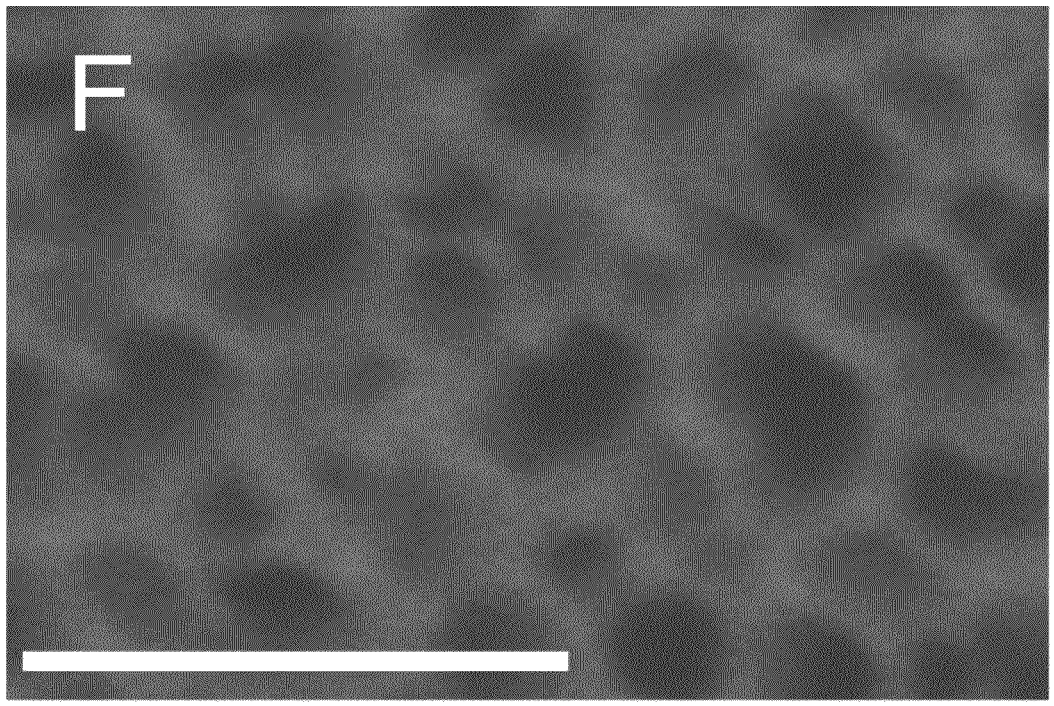
Figure 1G:
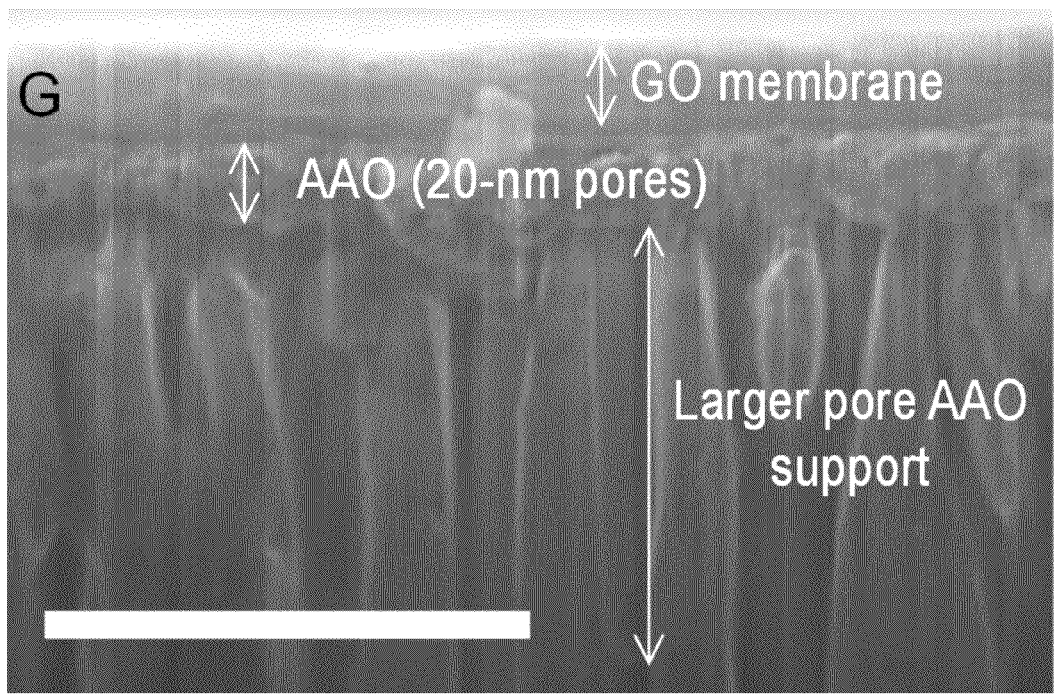
Figure 7:
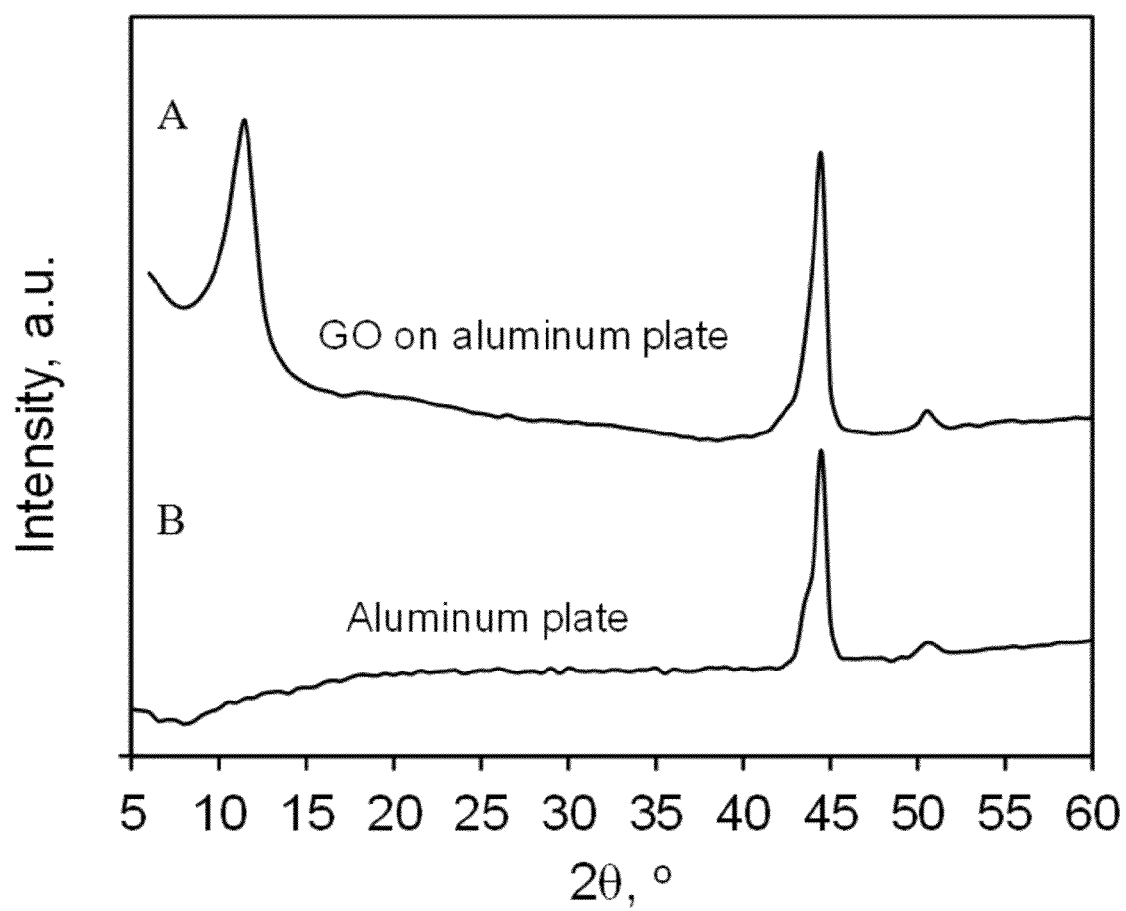
FIG. 7 shows a XRD patterns for (A) GO powder on Al plate and (B) blank Al plate.

It was found that centrifugation and dilution of GO dispersions are critical for preparing high quality GO membranes. For example, 30-min centrifuge at 10000 rpm can remove most of large particles/aggregates and 25-$m^1$ is an appropriate volume for preparing high quality GO membranes thinner than 20 nm. FIG. 1A shows a about 9-nm thick GO membrane with a permeation area of about 4 $cm^2$. Yellow Kapton tape with an open hole was attached on the surface of the GO membrane supported on an AAO filter to avoid direct contact between the sealing O-ring and the GO membrane surface. XRD shows the characteristic peak of GO at $2\theta$ of 11.1° (FIG. 7), and GO flakes are about 500 nm in size and single layered, as confirmed by the AFM image (FIG. 1B) and the height profile of a GO flake (FIG. 1C). FIGS. 1D and 1E show the surface of an 18-nm thick GO membrane on AAO. Compared with AAO support (FIG. 1F), a very thin GO coating can be clearly seen. We deposited a relatively thick GO membrane on AAO using a 25-ml GO dispersion in DI water with a known amount of GO and found its thickness is approximately 180 nm (FIG. 1G). GO dispersion for this 180-nm membrane preparation was then diluted 100, 20, and 10 times to obtain ca. 1.8-, 9-, and 18-nm thick GO membranes. X-ray photoelectron (XPS) spectroscopy was used to detect surface elements for these ultrathin GO membranes on AAO (FIGS. 1H and 1I); for 1.8-nm thick membrane, significant amount of aluminum in AAO can still be seen because mean free path of excited electrons is longer than surface GO membrane thickness, while for thicker membranes (9 and 18 nm), much smaller amounts of underlying aluminum in AAO can be seen because GO thickness is larger than excited electron mean free path. This is consistent with surface carbon detection by XPS as well (FIG. 1I). See Supplementary Material for detailed analysis.

Figure 2A:
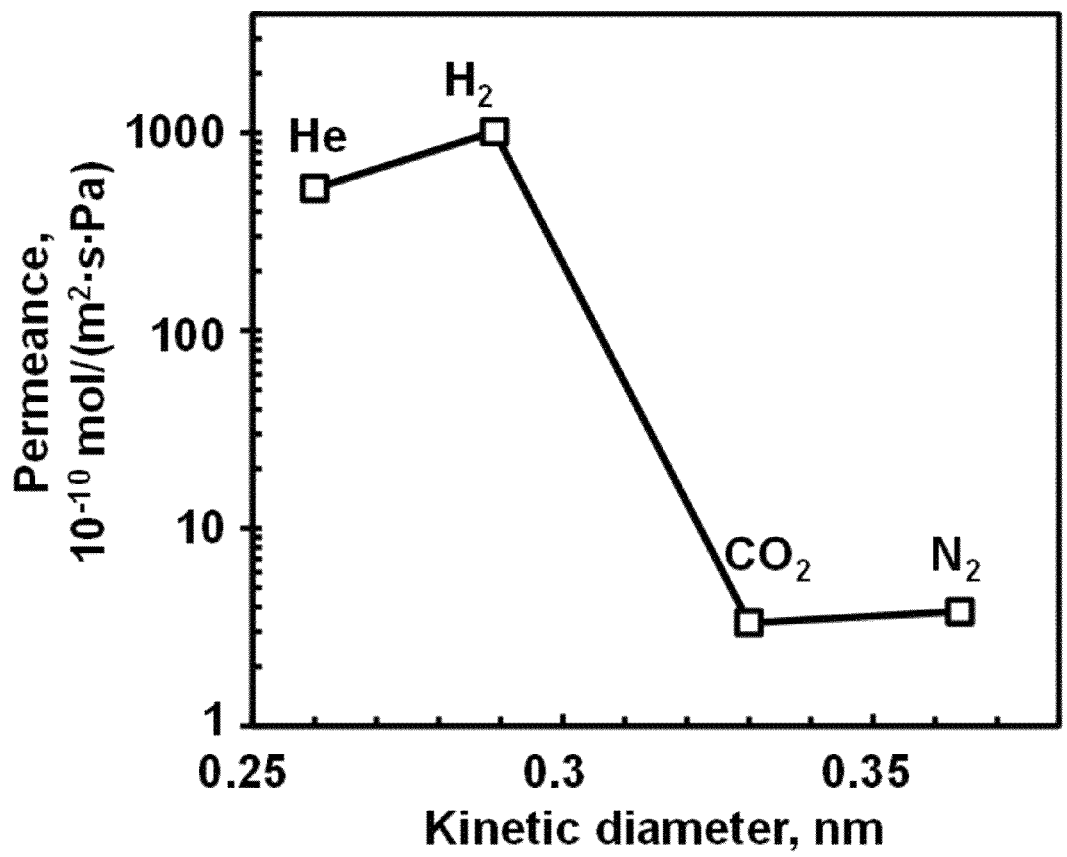
FIGS. 2A and 2B show single-gas permeation through GO membranes supported on porous AAO at 20° C., with FIG. 2A showing permeances of four molecules through an approximately 18-nm tick GO membrane and FIG. 2B showing permeances of $H_2$ and He through GO membranes with different thicknesses. The lines in FIG. 1B are exponential fits, which indicates permeances of $H_2$ and He decrease exponentially with membrane thickness, instead of expected inversely proportional to membrane thickness.
Figure 2B:
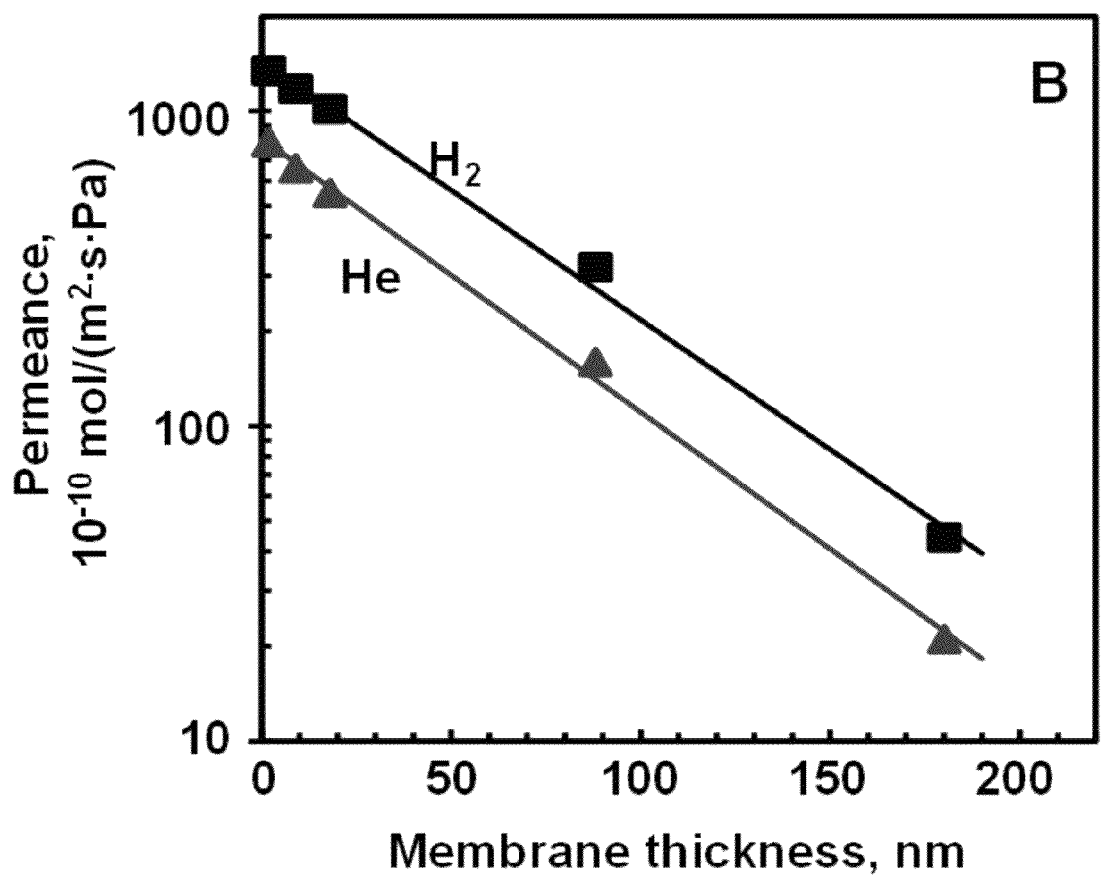

We conducted permeation of small gas molecules with different sizes to probe pore sizes in ultrathin (less than 20 nm) GO membranes. FIG. 2A shows the permeance (=flux/pressure drop) of four molecules (He, $H_2$, $CO_2$, and $N_2$) through an about 18-nm thick GO membrane at 20° C. Hydrogen permeated approximately 300 times faster than $CO_2$ and $N_2$ molecules, while their kinetic diameter differences are only 0.04 and 0.07 nm, respectively. This strongly suggests molecular-sieving behavior of the GO membrane; the average pore size in the GO membrane is probably smaller than a $CO_2$ molecule. We also made thicker GO membranes and measured their single gas permeation; for a 90-nm thick GO membrane, ideal selectivities (ratio of permeances of pure components) of $H_2$ over $CO_2$ and $N_2$ are as high as 1150 and greater than 1000, respectively, and $H_2$ permeance is $3.4\times 10-8$ mol/($m^2 \cdot s \cdot Pa$). This report, however, will focus on separation study of ultrathin GO membranes (less than 20 nm thickness). FIG. 2B shows $H_2$ and He permeances for GO membranes with different thickness (up to 180 nm). Gas permeance is usually expected to be inversely proportional to the membrane thickness due to the proportional increase of transport resistance with thickness (23). Surprisingly, we found $H_2$ and He permeances decrease exponentially with the increase of membrane thickness from 1.8 to 180 nm (FIG. 2B). We speculate major transport pathway for these molecules are structural defects on GO flakes, instead of spacing between GO flakes. Exponential dependence of $H_2$ and He permeances may result from the particular transport pathway of molecules through these structural defects in layered GO membranes. Various defects on graphene, such as line defect missing octagons passivated by hydrogen, nitrogen-functionalized pores, and other artificially drilled holes, have been found to be able to separate $H_2$ from other small molecules ($N_2$, $CH_4$ etc.). Intrinsic defects on GO flakes in our membranes may be attributed to molecular-sieving behavior of $H_2$ over other molecules. Koenig et al. found molecular-sieving behavior of porous graphene after UV-induced oxidative etching; $H_2/N_2$ ideal selectivity was higher than 10000 after etching. We noticed that some of their graphene sheets before etching showed high ideal selectivities for $H_2/CH_4$ (about 100) and $H_2/N_2$ (about 100), indicating intrinsic defects on graphene may also have decent molecular-sieving behavior. Their finding is consistent with our single-gas permeation results. Recently, Nair et al. prepared about 1 μm thick GO membranes using GO flakes and found that even helium can't permeate through (permeance<$2.5\times10-14$ mol/$m^2 \cdot s \cdot Pa$). If we extrapolate He permeance for 1 μm thick GO membrane using exponential fit in FIG. 2B, its permeance would be appropriately 10-16 mol/$m^2 \cdot s \cdot Pa$. This is consistent with Nair et al. finding. Therefore, for practical separation application of GO membranes, ultrathin thickness is essential in order to have reasonable gas permeances.

Figure 3A:
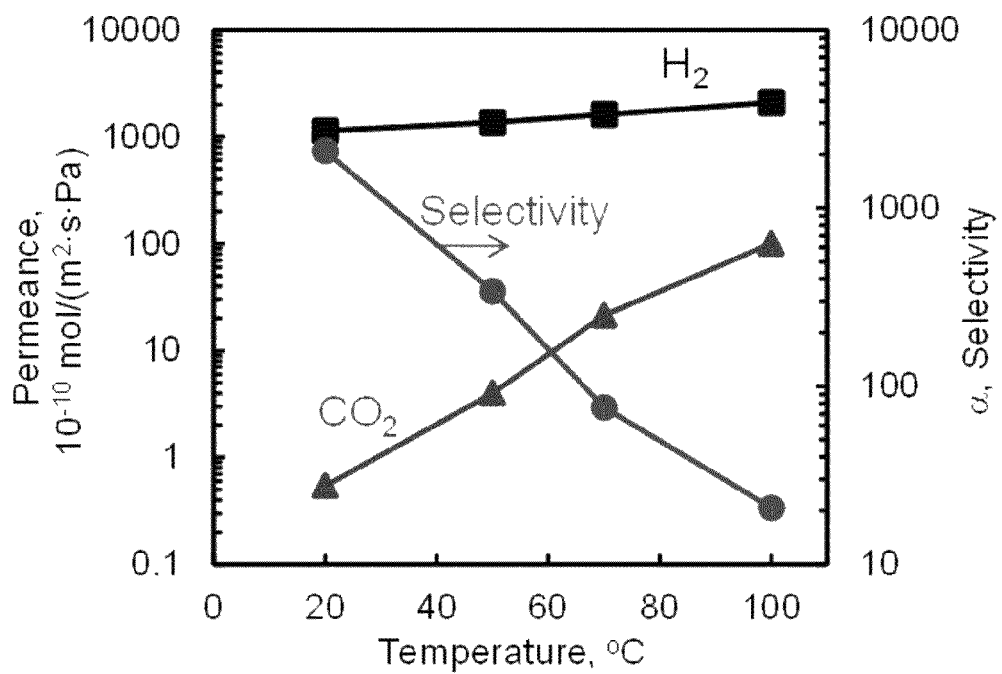
FIGS. 3A-3H show 50/50 $H_2/CO_2$ and $H_2/N_2$ mixture separation by ultrathin GO membranes and comparison with membranes in the literature for $H_2/CO_2$ mixture separation, with FIGS. 3A and 3B showing separation results for 1.8-nm thick GO membrane.
Figure 3B:
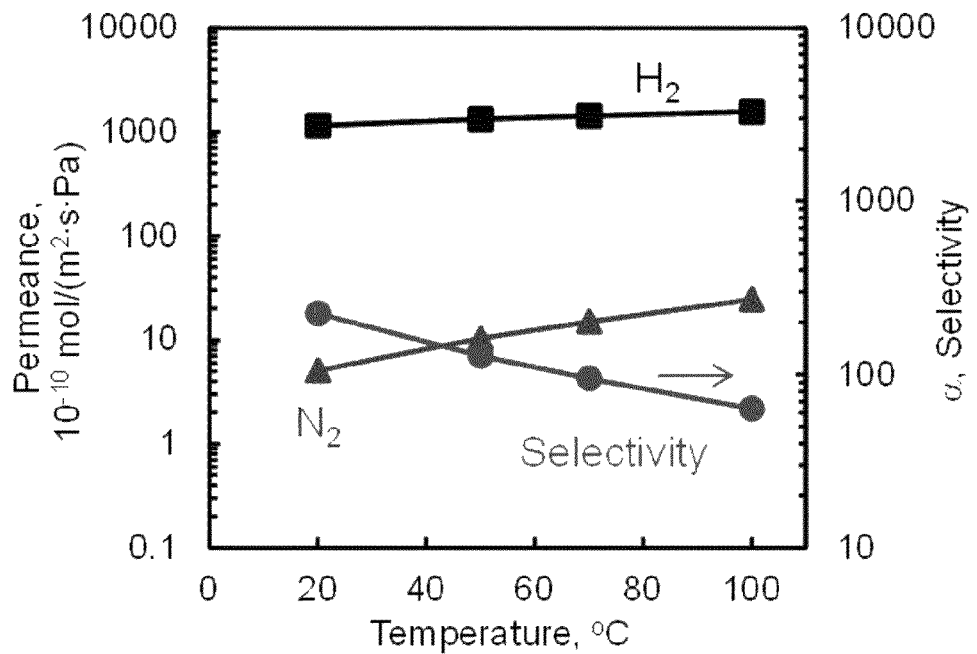
Figure 3C:
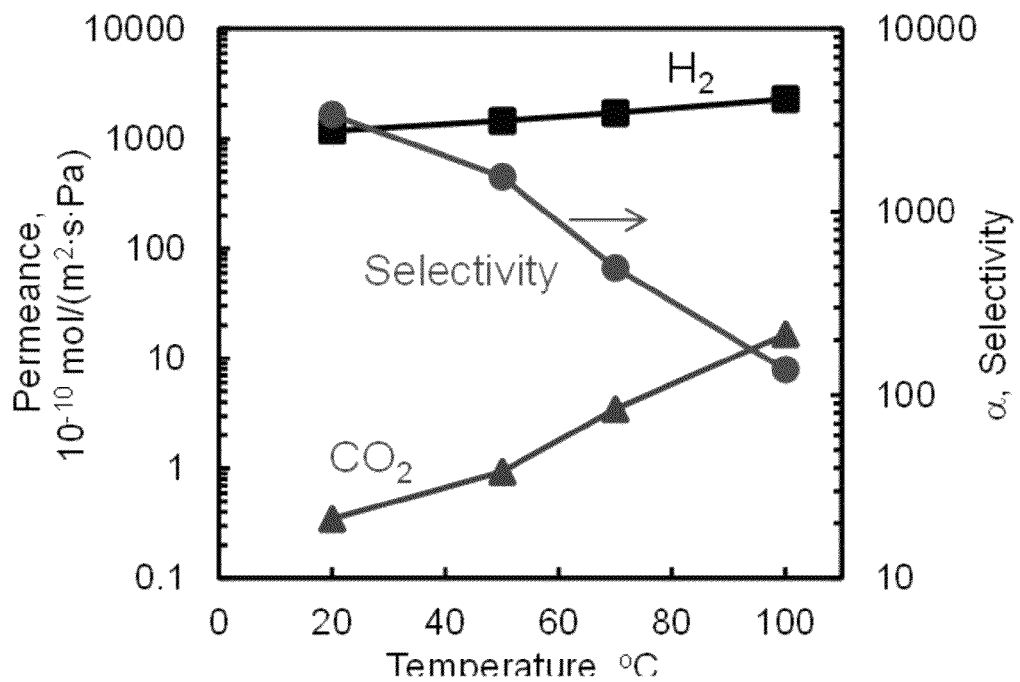
Figure 3D:
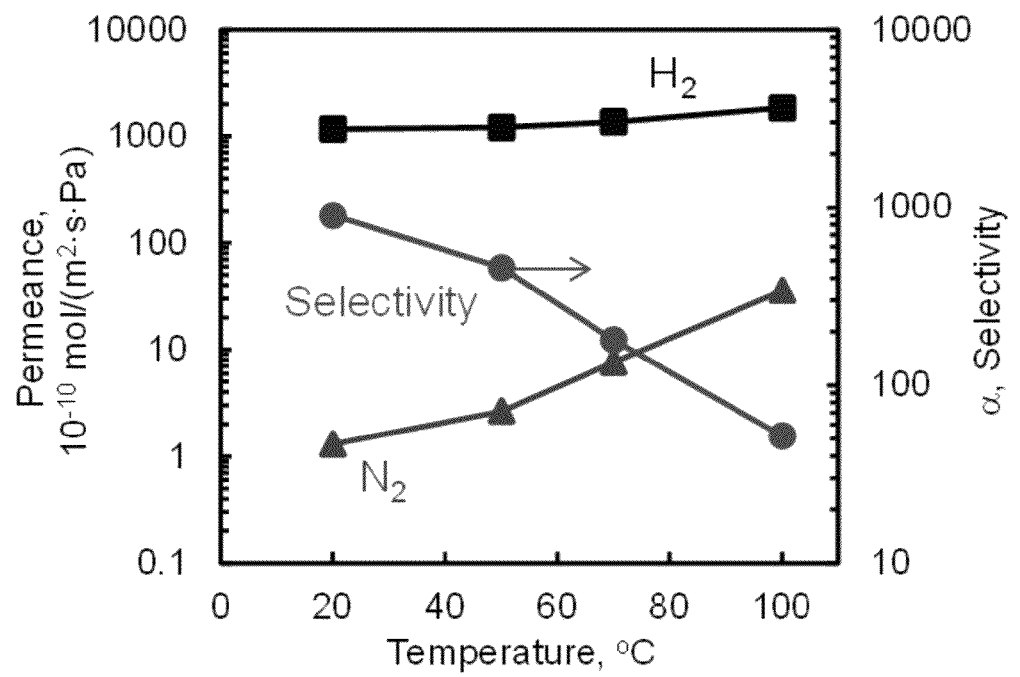
Figure 3E:
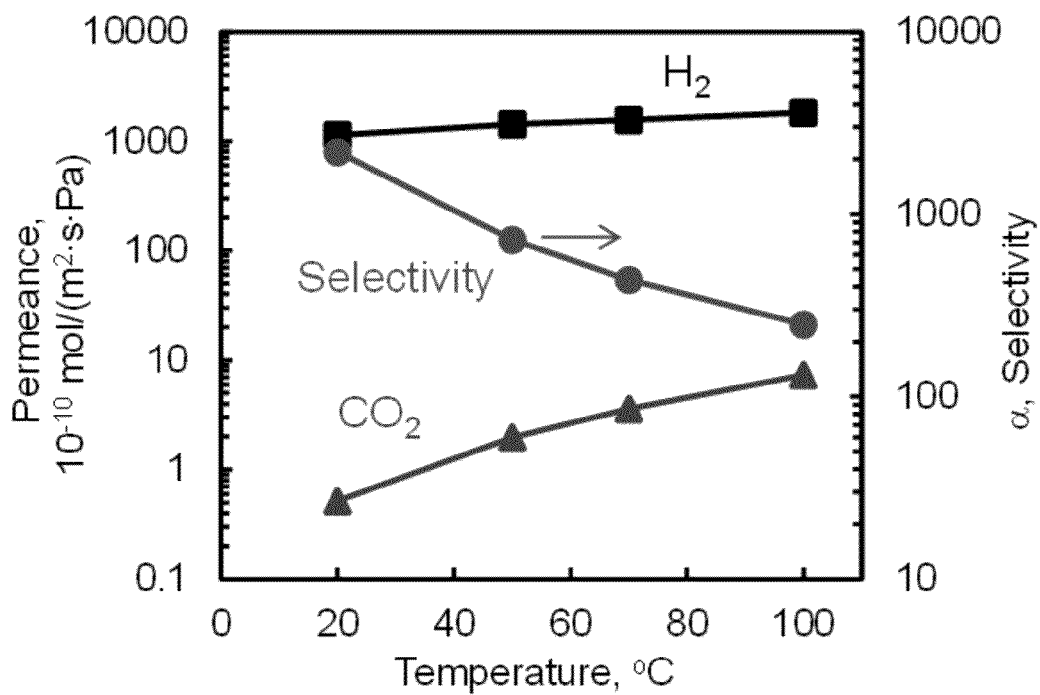
Figure 3F:
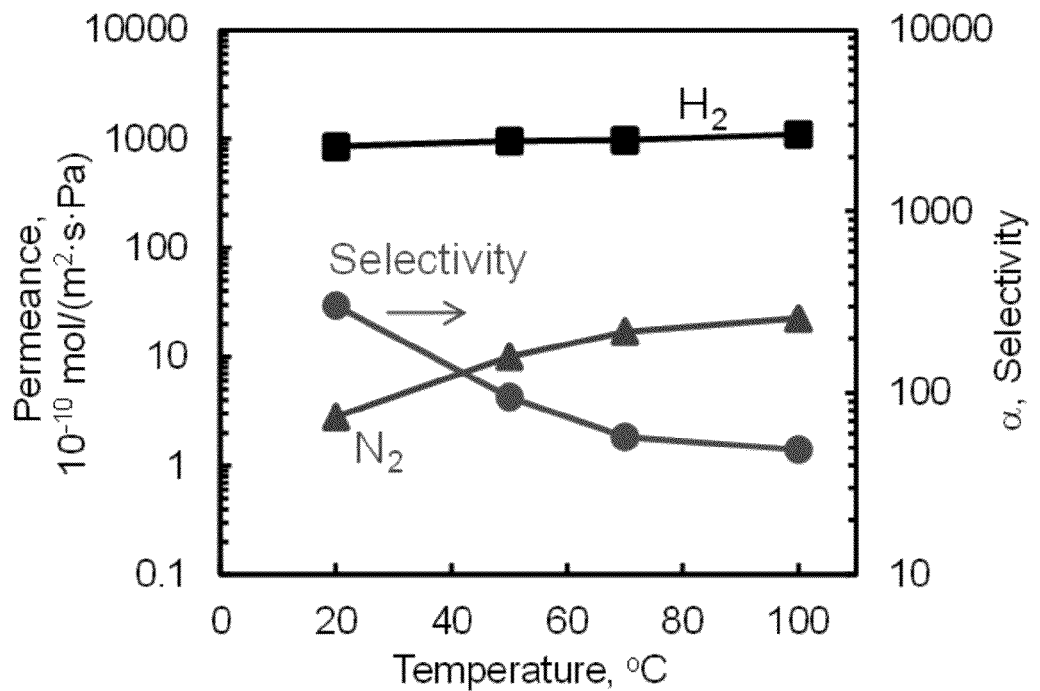
Figures 3G, 3H:
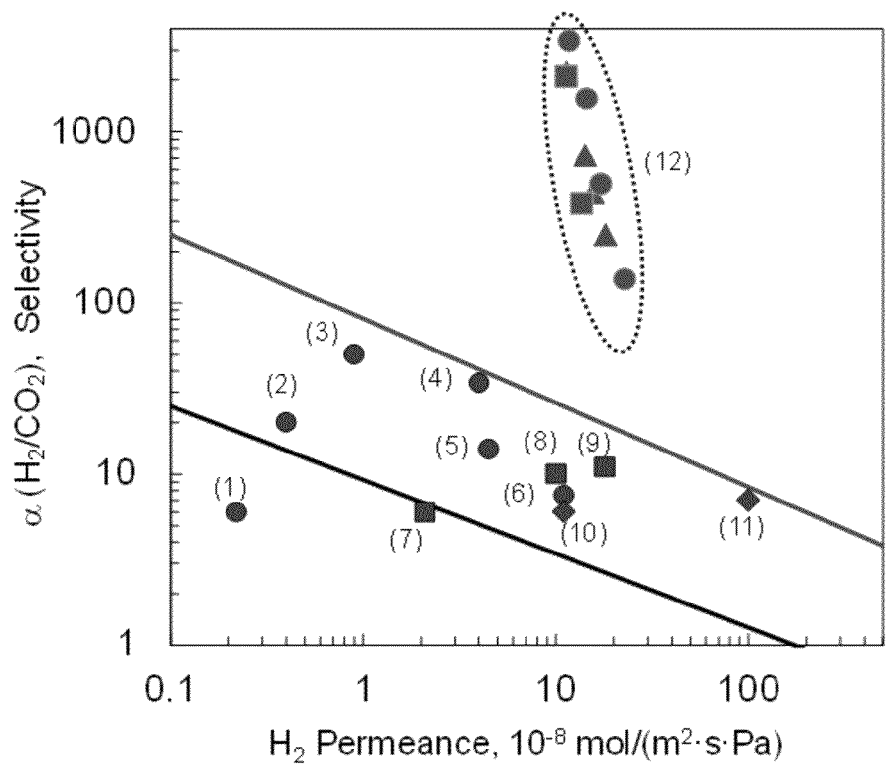
Figure 8:
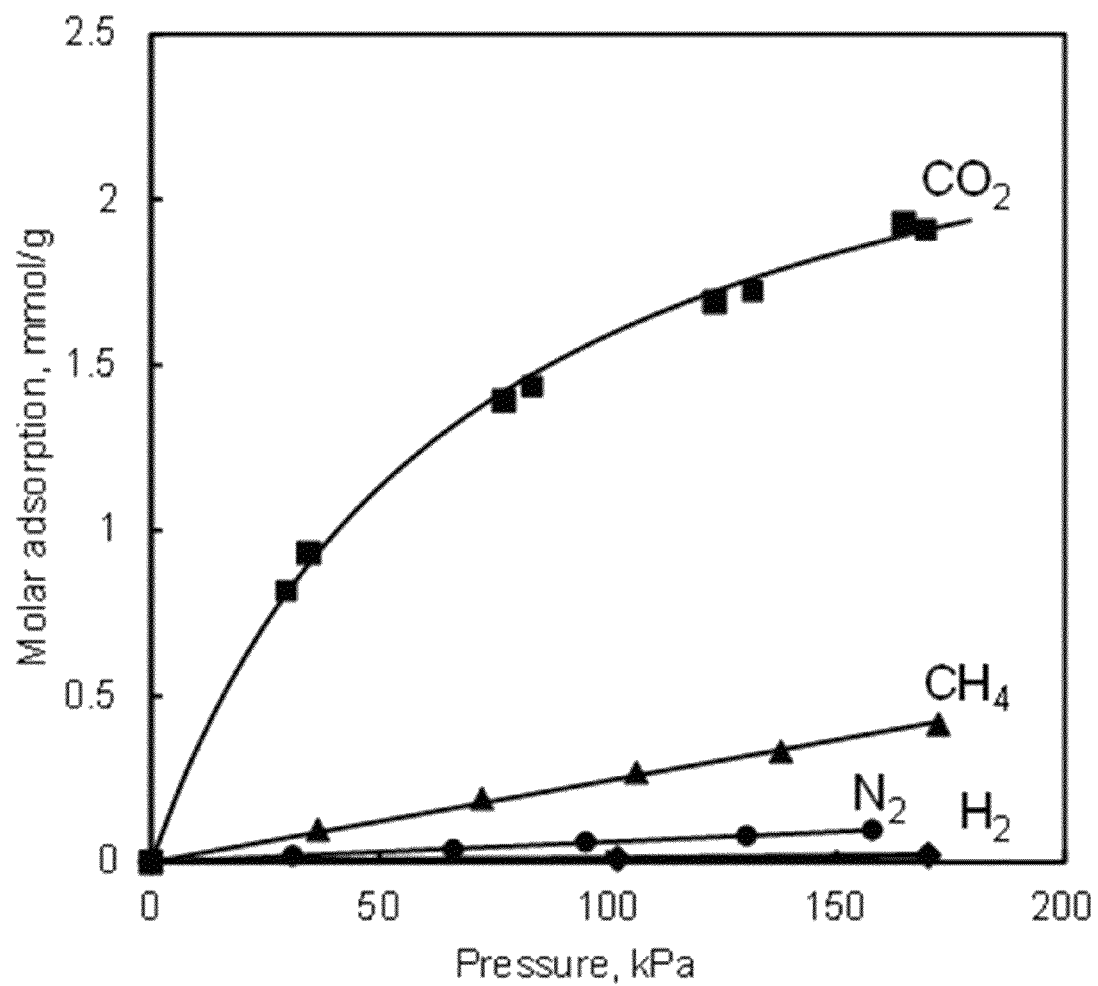
FIG. 8 shows gas adsorption isotherms of $CO_2$, $CH_4$, $N_2$, and $H_2$ on GO at 20° C.
Figure 9:
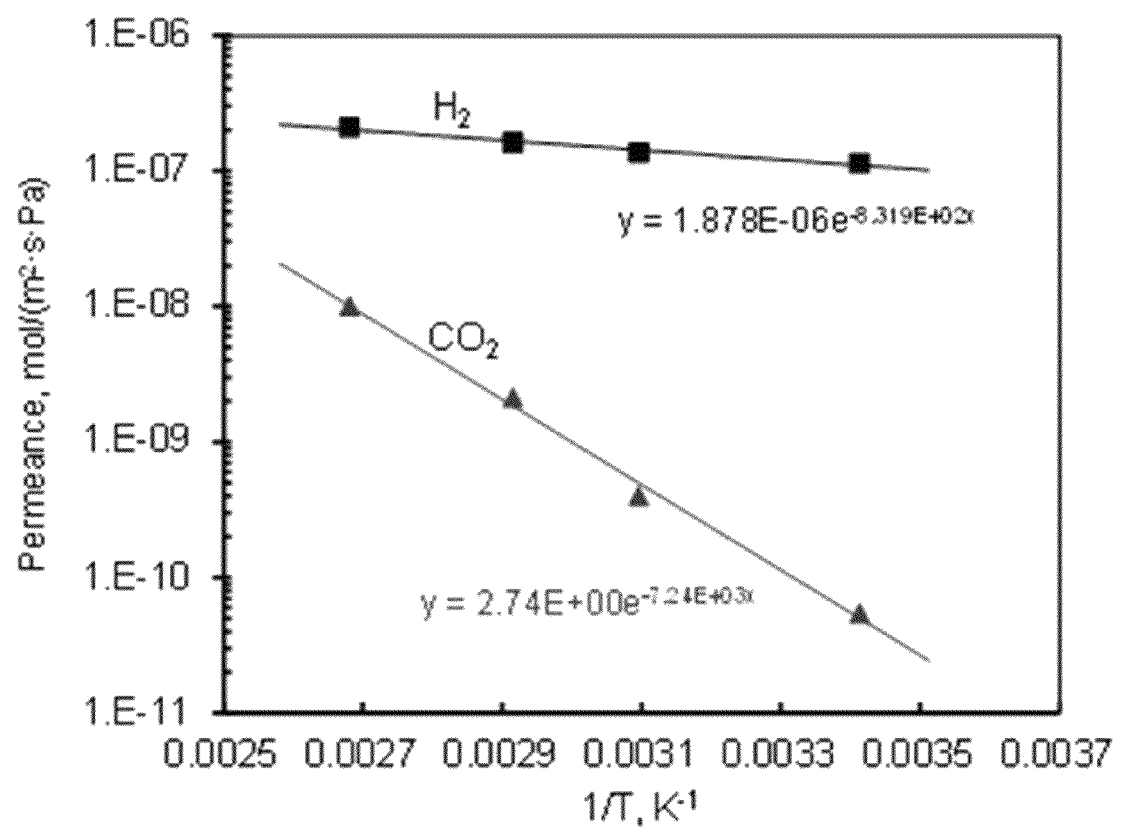
FIG. 9 shows Arrhenius temperature dependence of $H_2$ and $CO_2$ permeances in the 50/50 mixture for the 1.8-nm thick GO membrane. Gas permeance through the membrane satisfies Arrhenius dependence when adsorption is in Henry's region according to the equation.

Separation of $H_2$ from other small molecules has important applications for pre-combustion $CO_2$ capture, $H_2$ recovery for ammonia production, and natural gas upgrading. Separation selectivity, defined as the ratio of component permeances in mixtures, and permeance are two important parameters to evaluate membrane separation performance. Before evaluating separation performance of ultrathin GO membranes, a control experiment was first conducted to measure separation performance of an AAO support, and we found that permeances of studied gases were high (greater than $10^{-6}$ mol/($m^2 \cdot s \cdot Pa$)) and selectivitis of $H_2$ over $CO_2$ and $N_2$ were low (less than 5), as expected for Knudsen diffusion through 20 nm pores. We then performed 50/50 $H_2/CO_2$ and $H_2/N_2$ mixture separation from 20 to 100° C. for GO membranes with thickness from 1.8 to 18 nm. FIG. 3 shows separation results for 1.8-, 9-, and 18-nm thick GO membranes. All the GO membranes showed extremely high $H_2/CO_2$ selectivity (greater than 2000) at 20° C., with the highest of 3400 for the 9-nm thick membrane. This is unusual, because previous microporous membranes either showed low $H_2/CO_2$ selectivity or reversely selected $CO_2$ over $H_2$ at room temperature or lower temperatures due to strong adsorption of $CO_2$ in pores and thus blocking of $H_2$ permeation. We measured adsorption isotherms of $CO_2$, $CH_4$, $N_2$, and $H_2$ on GO powder and found that indeed $CO_2$ adsorbs much more strongly than $H_2$ on GO powder (FIG. 8). These results strongly suggest that true molecular-sieving separation of $H_2$ from $CO_2$ is achieved, because strongly adsorbed $CO_2$ on GO flakes has negligible effects on $H_2$ permeation, meaning $CO_2$ can't enter most of the structural defects on GO that are only for $H_2$ permeation. $CO_2$ seems to permeate through very small amount of larger structural defects that allow both $CO_2$ and $H_2$ permeation, and these larger defects are also selective for $H_2$ over $CO_2$, probably due to smaller size of $H_2$. This may explain higher $H_2/CO_2$ separation selectivity than ideal selectivity. $H_2/CO_2$ separation selectivity decreased with the increase of temperature, resulting from the faster increase of $CO_2$ permeance than that of $H_2$. But, at even 100° C., $H_2/CO_2$ selectivity is still 250 for the 18 nm thick membrane. This suggests a more activated $CO_2$ diffusion than $H_2$ through GO membranes, resulting from the tight fit of $CO_2$ molecules in these defects. $H_2/N_2$ mixture separation showed similar behavior, and the highest selectivity is approximately 900 for 9 nm GO membrane at 20° C. We prepared multiple GO membranes for each thickness and obtained good reproducibility; variation of membrane permeation performance is within 15% for all membranes, resulting from simple and highly controllable GO membrane deposition process. We also deposited ultrathin GO membranes on low-cost isopore cellulous acetate support (100 nm pores) and found similar separation performance; for example, for an approximately 18 nm thick GO membrane on cellulous acetate support, $H_2/CO_2$ and $H_2/N_2$ separation selectivities are 1112 and 300, respectively, with $H_2$ permeance of approximately $1.6 \times 10^{-7}$ mol/(m²·s·Pa). This suggests that ultrathin GO membrane preparation method is applicable to both inorganic supports and polymeric supports and indicates great commercialization potential for GO membrane preparation method. FIG. 3E shows a comparison of ultrathin GO membranes with polymeric membranes and inorganic membranes for $H_2/CO_2$ mixture separation. Typically, for membrane separation, with the increase of separation selectivity, permeance decreases. An upper bound can usually be used to compare the separation performance of a new membrane with previous membranes. Ultrathin GO membranes are far beyond the upper bounds for both polymeric membranes (lower line) and representative inorganic membranes (upper line). Therefore, ultrathin GO membranes clearly represent a great breakthrough for $H_2/CO_2$ mixture separation by membranes. FIG. 10 also shows the comparison of GO membranes with polymeric membranes for $H_2/N_2$ mixture separation; superior separation performance of GO membranes can also be seen. These mixture separation results indicate the great potential of the ultrathin GO membranes for molecular-sieving separation of $H_2$ from other small molecules and may have significant applications on industrially important $H_2$ separation processes.

Graphene Oxide (GO) Membrane Fabrication

Figure 4A:
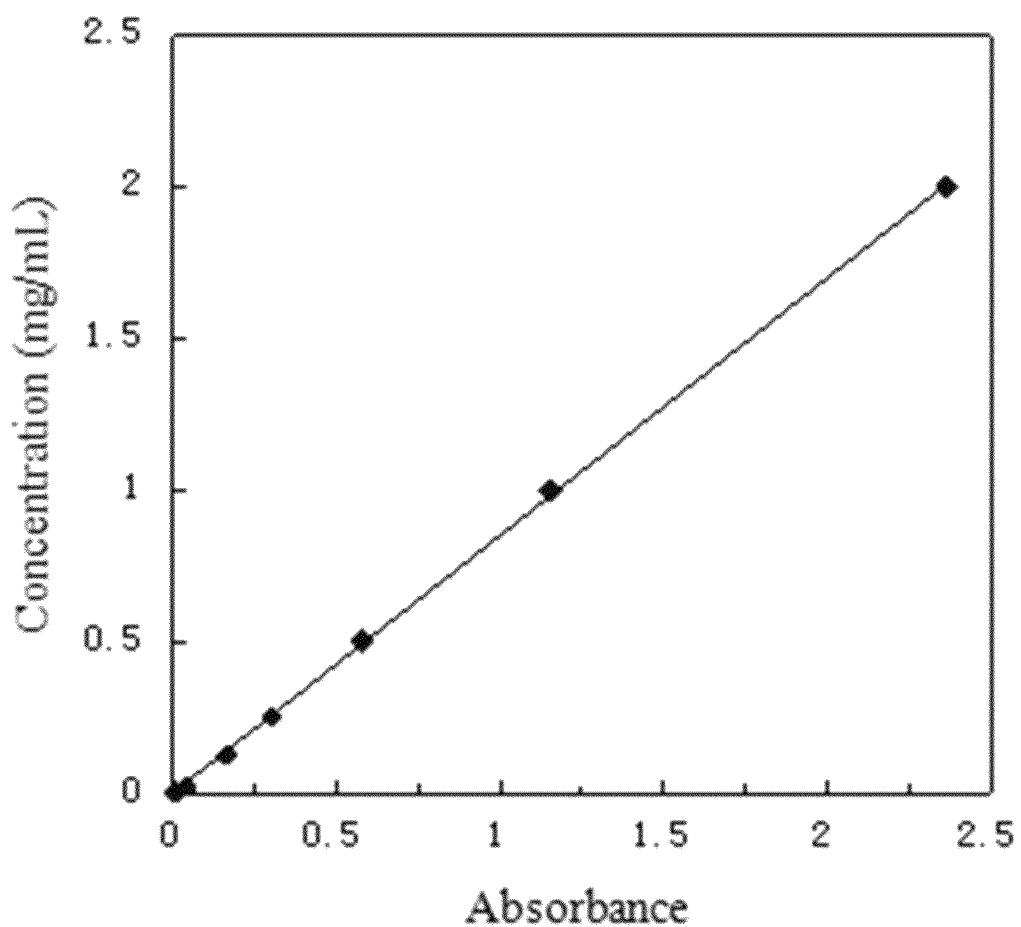
FIGS. 4A and 4B show absorbance curves for determination of the GO solution after centrifuge that uses UV-vis to measure the absorbance of the prepared GO standard solution (0, 0.02, 0.125, 0.25, 0.5, 1 and 2 mg/mL). It was found that the concentration of GO solution had an excellent linear fit with the UV absorbance, as shown in FIG. 4A.
Figure 4B:
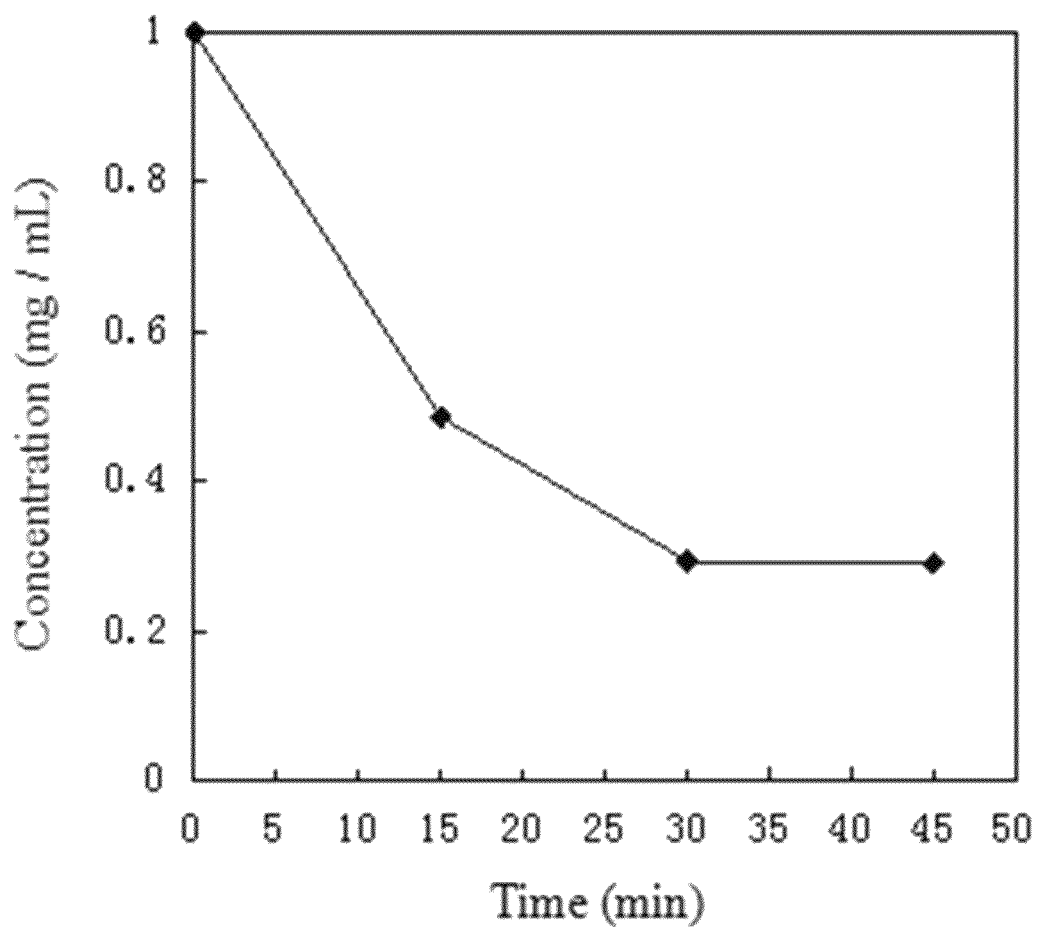
Figure 5:
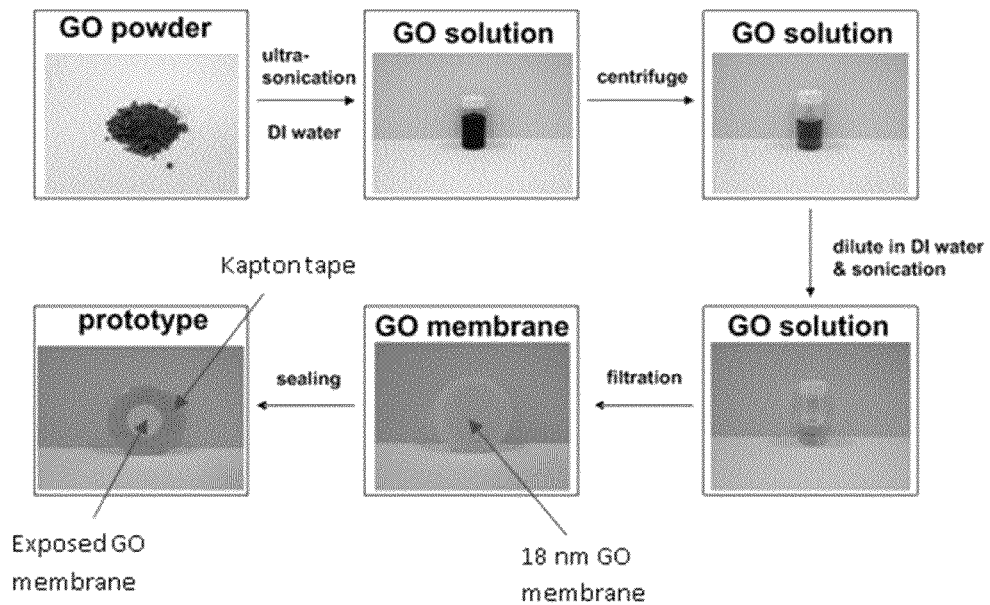
FIG. 5 shows an exemplary fabrication process of highly selective GO membranes.

Single-layered graphene oxide (SLGO) powder, prepared by the Modified Hummer's Method, were used as the raw material for membrane preparation. In an attempt to examine the commercialization potential of our membrane preparation process, a large quantity of SLGO was purchased from CheapTubes.com (greater than 1 gram), instead of preparing small quantity in our lab; 1 gram of SLGO powder is enough to prepare a total membrane area of greater than 50 m², assuming a membrane thickness of 10 nm and a membrane density similar to graphite. Firstly, SLGO powder was dissolved in DI water, followed by a 25 min sonication. Then, the dispersed SLGO powder was centrifuged at 10000 rpm for different times (Bio Lion XC-H165) to remove large particles/aggregates in the dispersion. This step is critical for preparing high quality membranes. The concentration of the resulting SLGO solution was measured by UV-vis (Shimadzu UV-2010PC) with a pre-calibrated curve of GO concentration vs. absorption at 600 nm wavelength, as shown in FIG. S1a. The effects of the centrifuge time on final SLGO concentration was investigated, and it was found that 30 and 40 min gave the same concentration, as shown in FIG. 4B. So, for membrane fabrication, SLGO dispersion was used after 30 min centrifuge. During fabricating GO membranes, the SLGO dispersion was used to do vacuum filtration (Millipore filtration system) through anodic aluminum oxide (AAO) filters with 20-nm pores (Whatman) or isopore cellulous acetate with 100-nm pores (Millipore). To roughly control the GO membrane thickness, the effective filtration area was calculated, and the known amount of GO was added in its 25-ml dispersion for filtration, assuming the membrane density is similar to that of graphite (about 2.1 g/cm³). The actual thickness of a thick GO membrane with known amount of GO was measured by FE-SEM (FIG. 1G) and used to calculate thickness of thinner GO membranes with much smaller amount of GO. The resulting GO membranes were stored in a vacuum desiccator (Nalgene) for about 15 hours to remove the residue water before permeation test. A schematic process of the fabrication steps is shown in FIG. 5.

Permeation/Separation Experimental Setup

Figure 6:
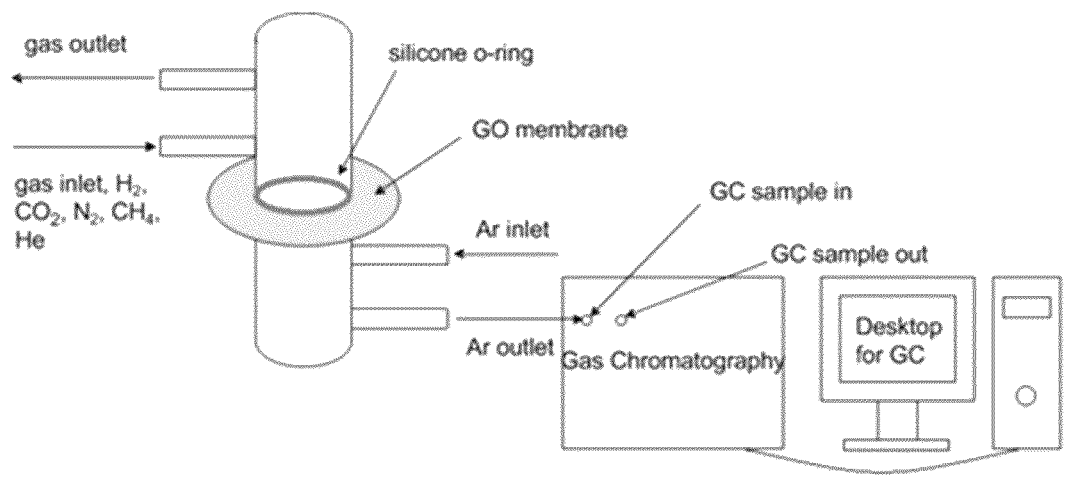
FIG. 6 shows an exemplary schematic drawing of gas permeation measurement system.

A glass membrane module was used for gas permeation/separation experiments. Silicon O-rings were used to seal the GO membranes on AAO supports or cellulous acetate supports. To avoid direct contact between O-rings and the GO membrane and thus potential damage on the thin GO membranes heat resistant Kapton tape was attached with a hole on the GO membranes to expose the desired membrane area for gas permeation; a coarse filter paper (Fisher Scientific) was placed at the bottom of the AAO or cellulose acetate support to protect the support. During permeation test, feed flow was either pure gasses or gas mixtures and their composition and total flow rate were controlled by Mass Flow Controllers (Brooks 5850); on the permeate side, argon was used as a sweep gas to bring permeates into a gas chromatography (GC) for composition analysis. The reason argon was used as the sweep gas is because argon was used as the carrier gas in GC for a better detection of $H_2$ by thermal conductivity detector (TCD) due to their large thermal conductivity difference. Nitrogen was detected by TCD, $CH_4$ and $CO_2$ were detected by both TCD and flame ionization detector (FID) ($CO_2$ as $CH_4$ by a methanizer). Typically, total feed flow rates were 45 sccm for single-gas permeation and 90 sccm for mixture separation, and permeate argon flow rate was 25 sccm. A low pressure drop (about 10 kPa) or no pressure drop across the membranes was applied to avoid breaking or deforming the thin supports; for low pressure drop, the feed outlet gas tubing was plugged underneath a certain depth of water to control the feed pressure. It was found that permeances for both single gases and gas mixtures were similar with and without pressure drop. Therefore, only data collected without pressure drop were reported here. A heating tape was used to heat the membrane and a temperature controller was used to control the membrane temperature, if needed. The schematic for the permeation setup is shown in FIG. 6.

Characterization

1 X-Ray Diffraction (XRD) Study of the GO Powder:

X-ray powder diffraction (XRD) was carried out using a Rigaku MiniFlex II diffractometer with Cu Kα radiation (λ=0.15418 nm). The diffraction data was recorded for 2θ angles between 5° and 60°. XRD pattern for the GO powder was shown in FIG. 7. The characteristic diffraction peak (002) of GO is ascribed to the introduction of oxygenated functional groups, such as epoxy, hydroxyl (—OH), carboxyl (—COOH) and carbonyl (—C=O) groups attached on both sides and edges of carbon sheets.

2 X-Ray Photoelectron Spectroscopy (XPS) Analysis of GO Membranes

Figure 1H:
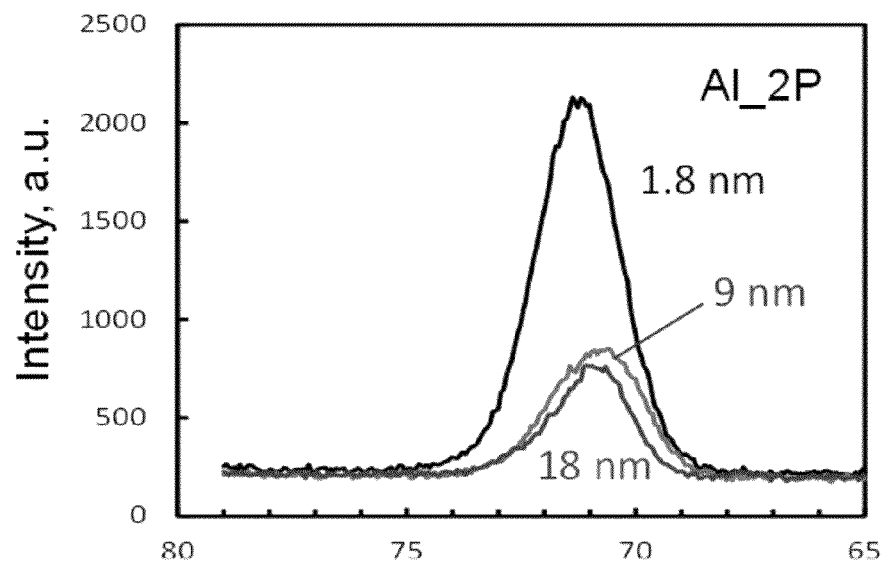
Figure 1I:
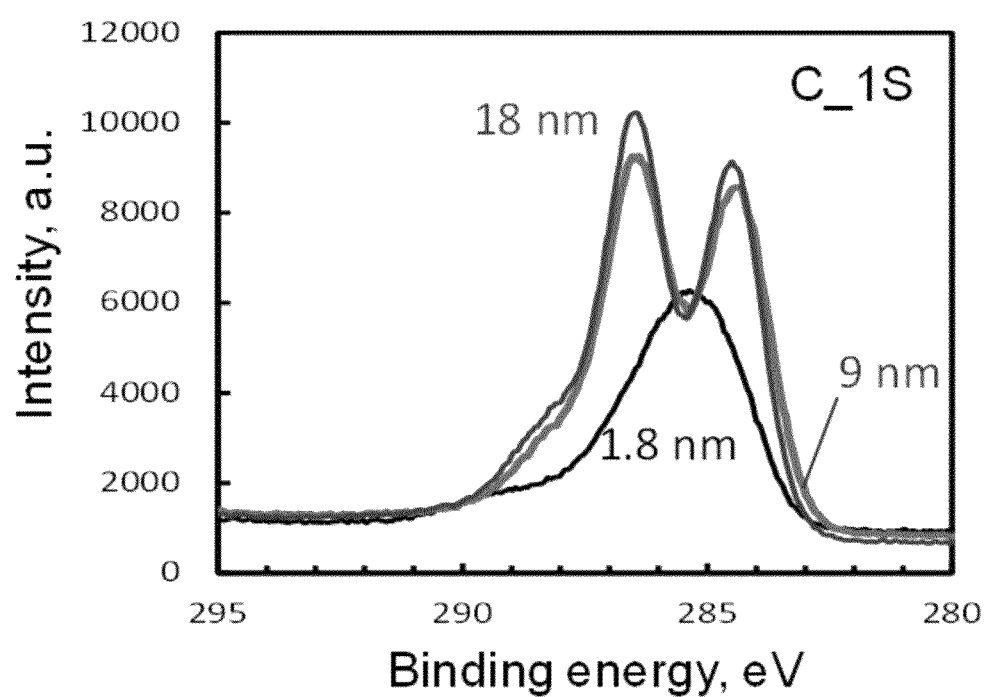

The surface chemical compositions of GO membranes with different thickness (1.8, 9 and 18 nm) was analyzed by XPS (Kratos Axis Ultra DLD instrument equipped with a monochromated Al Kα x-ray source and hemispherical analyzer capable of an energy resolution of 0.5 eV), as shown in FIG. 1H and FIG. 1I. The Al 2p peak appears near 74.3. For C 1s, 284.5 eV corresponds to the C—C, C=C and C—H bonds. 286.5 eV and 288.3 eV are assigned to C—O and C=O, respectively. We calculate the kinetic energy for Al 2p electrons with the equation Ekinetic=EX-ray photon−Ebinding−Φ, where EX-ray photon is 1486.7 eV for Al Kα x-ray source, Ebinding for Al 2p electrons is 74.3 eV as shown in FIG. 1(H), and the working function Φ is 4.26 eV. Thus, the kinetic energy for Al 2p electrons is 1408.14 eV. By applying the dependence of inelastic mean free path (IMFP) for electrons on their kinetic energy (35), we get the λIMFP around 3.4 nm, which is larger than the thickness of our 1.8 nm GO membrane. Similarly, for C 1s electrons, λIMFP in carbon is approximately 3 nm, which is smaller than the thickness of both 9 and 18 nm GO membrane. This is why as the membrane thickness increases, C 1s peak intensity increases, while Al 2P peak intensity decreases, and for 9 and 18 nm GO membranes on AAO, Al 2p and C 1s spectra are similar.

3 Atomic Force Microscopy (AFM) Study of GO Flakes

To prepare samples for AFM imaging, 0.002 mg/mL GO suspensions were first diluted 1000 times. A 4 uL drop of diluted suspension was deposited onto freshly cleaved muscovite mica disks (9.9 mm diameter, Grade V1, Structure Probe, Inc.) and dried for at least 20 mins at 323K prior to AFM imaging. The deposited GO sheets were imaged using a PicoPlus AFM (Agilent) operated in the tapping mode. All images were collected using N-type silicon cantilevers (FORTA-50, Nanoscience Instruments, Inc.) with spring constants of 1.2-6.4 N/m, resonance frequencies of 47-76 kHz, and nominal tip radius of <10 nm. The height resolution of the AFM scanner is less than 1 A. Thus, with proper calibration, the accuracy of the measured height of surface features is approximately ±0.1 nm. The AFM topography images were analyzed using image analysis software (Scanning Probe Image Processor or SPIP, Image Metrology A/S, Denmark), as shown in FIG. 1B. It is seen that the GO sheet is a typical single-layer GO flake with a dimension of 300-700 nm. The GO flake showed a smooth planar structure. The height profile diagram FIG. 1C of the AFM image showed that the thickness of the single-layer GO sheet was 0.7-0.9 nm, which is in coordination with the 0.8 nm as the typical thickness of the observed single-layer GO.

4 Field Emission Scanning Electron Microscopy (FE-SEM) Study of the GO Membranes FIG. 1E-F shows the FE-SEM (Zeiss Ultraplus Thermal Field Emission Scanning Electron Microscope) images for blank AAO and 18 nm GO membranes coated on AAO, respectively. The difference between coated and uncoated AAO can be easily noticed that for uncoated AAO, there are 20 nm pores all around the surface dispersed uniformly, while for the coated AAO with thin layers of GO on the top, the AAO intrinsic 20 nm pores are covered by GO layers. A cross-section image for our 180 nm thick GO membrane on AAO support is shown in FIG. 1G.

5 Gas Adsorption Isotherms Study on GO Powder

Adsorption isotherms of $CO_2$, $CH_4$, $N_2$, and $H_2$ on GO powder were measured by a volumetric method using a home-built adsorption system. GO powder (about 0.5 g) was firstly outgassed at 80-100° C. overnight. Helium was then used to calibrate the volume of adsorption cell with GO powder at 20° C. After vacuum to remove residue gasses in the adsorption system, interested gases were introduced at 20° C. to measure the adsorption isotherms on GO. The operating pressure range is from 0 to 170 kPa.

6 High-Resolution Transmission Electron Microscopy (HRTEM) Study of the GO Flakes To find out the defects on the single-layer GO sheets, we conducted HRTEM (JEOL JEM 2100F HRTEM). FIG. 11 shows a HR-TEM of a GO flake. Under the current resolution, no conclusive evidence shows obvious defects on GO flakes, although Raman spectrum suggests the existence of defects on GO (see analysis below).

7 Raman Spectroscopy Analysis of GO Powder

To further study the structural properties of the GO powder, we conducted Raman spectroscopy. A LabRam confocal Raman spectrometer (JY Horiba) is used for the measurement. The spectrometer is equipped with a liquid-nitrogen cooled, charged coupled device (CCD) detector, and a He—Ne (632.817 nm) laser for excitation. The well-known Raman characteristics of carbon materials are the G and D bands (1580 and 1350 cm$^{-1}$) which are usually assigned to the graphitized structure and local defects/disorders particularly located at the edges of graphene and graphite platelets. Therefore, a smaller ID/IG peak intensity ratio can be assigned to lower defects/disorders in the graphitized structure. The Raman spectrum shown in FIG. 12 display the G band at 1585 cm$^{-1}$ and the D band at 1338 cm$^{-1}$. The values of the ID/IG ratio were also obtained and presented in FIG. 12. A methodology to correlate the ID/IG ratio with the distance between pointlike defects (LD) on single layer graphene (SLG), focusing on the low-defect density regime (LD≥10 nm), is shown in the following equation:

$$L_D^2 (nm^2) = \frac{(4.3 \pm 1.3) \times 10^3}{E_L^4} \left(\frac{I_D}{I_G}\right)^{-1}$$

By substitute ID/IG=1.09 and EL=1.96 eV for the He—Ne (632.817 nm) laser into this equation, we can get the LD between 13.6 to 18.6 nm, assuming this dependence of ID/IG on LD can also be applied to SLGO. The detailed derivation of this equation can be found in references.

In summary, ultrathin GO membranes, down to about 1.8 nm in thickness, which is the thinnest gas separation membranes so far, were prepared by a facile, highly repeatable, and scalable filtration deposition process. Ultrathin GO membranes can be deposited on both inorganic porous supports and low-cost polymeric supports, indicating generality of the membrane preparation method and great potential for commercialization. A very small amount of GO per area, resulting from the ultrathin membrane thickness, also makes this material low cost for preparing large area separation membranes. This new class of ultrathin GO membranes showed molecular-sieving separation behavior for $H_2$ mixtures; unprecedented $H_2/CO_2$ separation selectivities, e.g., greater than 3000, were obtained, and $H_2/N_2$ mixture separation selectivities can be as high as 900, for membranes thinner than 20 nm. These results indicate the great potential of these ultrathin GO membranes for industrially important $H_2$ separations and may have wide applications, including but not limited to, gas sensors and for seawater desalination.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming an ultrathin graphene oxide membrane, the method comprising:
dispersing a single-layered graphene oxide powder in deionized water to form a single-layered graphene oxide dispersion;
centrifuging the graphene oxide dispersion to remove aggregated graphene oxide material from the single-layered graphene oxide dispersion;
thereafter, diluting the single-layered graphene oxide dispersion by about ten times or more through addition of deionized water to the graphene oxide dispersion; and
thereafter, passing the single-layered graphene oxide dispersion through a substrate such that a graphene oxide membrane is formed on the substrate.

2. The method of claim 1, further comprising:
after diluting the single-layered graphene oxide dispersion and prior to passing the single-layered graphene oxide dispersion through a substrate, sonicating the single-layered graphene oxide dispersion.

3. The method of claim 2, wherein the single-layered graphene oxide dispersion is sonicated for greater than about 15 hours.

4. The method of claim 2, wherein the single-layered graphene oxide dispersion is sonicated at about 5,000 rpm to about 15,000 rpm.

5. The method of claim 2, wherein single-layered graphene oxide dispersion is sonicated at about 10,000 rpm.

6. The method of claim 1, further comprising:
drying the graphene oxide membrane to remove any residue deionized water therefrom.

7. The method of claim 6, wherein drying the graphene oxide membrane comprises storing the graphene oxide membrane in a vacuum desiccator.

8. The method of claim 1, wherein the graphene oxide dispersion is centrifuged for about 30 minutes to about 40 minutes.

9. The method of claim 1, herein the graphene oxide membrane comprises a plurality of single-layered graphene oxide flakes.

10. The method of claim 9, wherein the graphene oxide membrane comprises about 3 to about 10 layers of single-layered graphene oxide graphene oxide flakes.

11. The method of claim 10, wherein the single-layered graphene oxide flakes have a size up to about 500 nm.

12. The method of claim 1, wherein the graphene oxide membrane has a thickness of about 1.8 nm to about 180 nm.

13. The method of claim 1, wherein the graphene oxide membrane has a thickness of about 1.8 nm to about 20 nm.

14. The method of claim wherein the graphene oxide membrane has a thickness of about 1.8 nm to about 18 nm.

15. The method of claim 1, wherein the substrate is supported on a filter, wherein the filter comprises pores that are larger than pores in the substrate.

16. The method of claim 15, wherein the filter comprises pores having a pore size of about 20 nm to about 100 nm.

17. The method of claim 1, wherein the graphene oxide membrane has an area of about 4 $cm^2$ or greater.

18. The method of claim 1, wherein the substrate comprises an anodic aluminum oxide or a cellulose acetate.

19. The method of claim 1, wherein the single-layered graphene oxide dispersion is diluted by about 20 times or more through addition of deionized water to the graphene oxide dispersion.

20. The method of claim 1, wherein the single-layered graphene oxide dispersion is diluted by at least 100 times through addition of deionized water to the graphene oxide dispersion.

21. The method of claim 1, wherein the single-layered graphene oxide dispersion has a concentration of about 0.2 mg/mL to about 0.4 mg/mL.

22. The method of claim 1, wherein the single-layered graphene oxide dispersion has a concentration of about 0.3 mg/mL.

* * * * *